US012794259B2

(12) United States Patent

Moore et al.

(10) Patent No.: US 12,794,259 B2

(45) Date of Patent: Nov. 10, 2026

(54) HELMET-MOUNTED POWER SYSTEM

(71) Applicant: Galvion Ltd., Portsmouth, NH (US)

(72) Inventors: Christopher Martin Moore, Bristol (GB); Adam Hennick, Montreal (CA); Nicolas Desjardins, Pincourt (CA); David DeTroy, Chester, NH (US)

(73) Assignee: GALVION LTD., Portsmouth, NH (US)

( * ) Notice: Subject to any disclaimer, the term of this patent is extended or adjusted under 35 U.S.C. 154(b) by 45 days.

(21) Appl. No.: 18/958,111

(22) Filed: Nov. 25, 2024

(65) Prior Publication Data

US 2025/0088028 A1 Mar. 13, 2025

Related U.S. Application Data

(63) Continuation of application No. 17/879,872, filed on Aug. 3, 2022, now Pat. No. 12,155,263.

(Continued)

(51) Int. Cl.

*H02J 9/04* (2006.01)

*A42B 3/04* (2006.01)

(Continued)

(52) U.S. Cl.

CPC .............. *H02J 9/04* (2013.01); *A42B 3/0406* (2013.01); *H02J 7/50* (2026.01); *H02J 7/82* (2026.01); *H02J 2207/20* (2020.01)

(58) Field of Classification Search

CPC ........ H02J 9/04; H02J 7/50; H02J 7/82; H02J 7/0048; H02J 7/0013; H02J 2207/20; A42B 3/0406

See application file for complete search history.

(56) References Cited

U.S. PATENT DOCUMENTS 860,322 A 7/1907 Anton 1,272,309 A 7/1918 Paupa (Continued)

FOREIGN PATENT DOCUMENTS

CN 1434282 A1 8/2003

CN 109923500 B 1/2022

(Continued)

OTHER PUBLICATIONS

Abu-Qahouq, Jaber A. et al., "Control Scheme for high-efficiency high-performance two-stage power converters", 2009, Twenty-Fourth Annual IEEE Applied Power Electronics Conference and Exposition, 7 pages.

(Continued)

*Primary Examiner* — Carlos Amaya

(74) *Attorney, Agent, or Firm* — DAY PITNEY LLP; George N. Chaclas; Jacob J. Golan

(57) ABSTRACT

A power system that is attachable to a helmet is disclosed. The power system provides power and data connections for helmet-mounted accessory devices and provides power to the accessory devices. The power system includes a base unit that is attachable to the helmet. The base unit includes a processor, an internal power source, and one or more cable interfaces. One or more accessory interfaces can each be attached to the helmet, connected to a cable interface, and connected to an accessory device. The base unit further include an interface for attaching a power module to the base unit. The power module includes one or more removable power sources. The base unit selectively provides, to an accessory device connected to an accessory interface, power from either the internal power source or from a removable power source.

24 Claims, 13 Drawing Sheets

Related U.S. Application Data

(60) Provisional application No. 63/230,309, filed on Aug. 6, 2021.

(51) Int. Cl.
*H02J 7/50* (2026.01)
*H02J 7/82* (2026.01)

(56) References Cited

U.S. PATENT DOCUMENTS

| | | | |
|---|---|---|---|
| 1,833,741 | A | 11/1931 | Diehl |
| 2,126,697 | A | 8/1938 | Bigelow |
| 2,270,238 | A | 1/1942 | Clarke et al. |
| 2,445,203 | A | 7/1948 | Bowers |
| 2,468,697 | A | 4/1949 | Wiley |
| 2,649,019 | A | 8/1953 | Hartline et al. |
| 2,814,043 | A | 11/1957 | Alesi |
| 2,908,914 | A | 10/1959 | Lasecki |
| 2,918,060 | A | 12/1959 | Lobelle |
| 3,069,511 | A | 12/1962 | Irving et al. |
| 3,154,788 | A | 11/1964 | Simpson |
| 3,264,392 | A | 8/1966 | Taplin |
| 3,280,246 | A | 10/1966 | Lawson et al. |
| 3,383,705 | A | 5/1968 | Raschke |
| 3,548,411 | A | 12/1970 | Barstow et al. |
| 3,568,211 | A | 3/1971 | Petruzella, Jr. |
| 3,601,813 | A | 8/1971 | Aileo |
| 3,624,663 | A | 11/1971 | Jones |
| 3,703,750 | A | 11/1972 | Irwin, Jr. |
| 3,758,889 | A | 9/1973 | Erb |
| 3,781,915 | A | 1/1974 | Menold et al. |
| 3,815,155 | A | 6/1974 | Davison et al. |
| 3,833,300 | A | 9/1974 | Rymes |
| 3,967,050 | A | 6/1976 | Makihara et al. |
| 4,028,743 | A | 6/1977 | Christensen |
| 4,044,268 | A | 8/1977 | Hammel et al. |
| 4,109,105 | A | 8/1978 | Von Statten, Jr. |
| 4,150,464 | A | 4/1979 | Tracy |
| 4,224,694 | A | 9/1980 | Palmaer |
| 4,263,679 | A | 4/1981 | Erlendson |
| 4,276,657 | A | 7/1981 | Montesi |
| 4,364,636 | A | 12/1982 | Ellis |
| 4,449,787 | A | 5/1984 | Burbo et al. |
| 4,536,892 | A | 8/1985 | Brinkhoff et al. |
| 4,589,075 | A | 5/1986 | Buennagel |
| 4,670,912 | A | 6/1987 | Hart |
| 4,689,836 | A | 9/1987 | Mtaloni |
| 4,703,879 | A | 11/1987 | Kastendieck et al. |
| 4,734,939 | A | 4/1988 | Copp |
| 4,810,832 | A | 3/1989 | Spinner et al. |
| 4,888,831 | A | 12/1989 | Oleson |
| 4,893,919 | A | 1/1990 | Nightingale |
| 4,901,210 | A | 2/1990 | Hanabusa |
| 4,907,296 | A | 3/1990 | Blecha |
| 4,910,100 | A | 3/1990 | Nakanishi et al. |
| 4,918,752 | A | 4/1990 | Briggs |
| 4,922,550 | A | 5/1990 | Verona et al. |
| 4,931,947 | A | 6/1990 | Werth et al. |
| 4,942,628 | A | 7/1990 | Freund |
| 4,943,222 | A | 7/1990 | Nathoo |
| H833 | H | 11/1990 | Brindle |
| 4,975,981 | A | 12/1990 | Ray |
| 4,987,608 | A | 1/1991 | Cobb |
| 5,042,093 | A | 8/1991 | Legendre |
| D329,806 | S | 9/1992 | Kindt |
| 5,153,496 | A | 10/1992 | Laforge |
| 5,176,342 | A | 1/1993 | Schmidt et al. |
| 5,184,231 | A | 2/1993 | Ellis |
| 5,226,181 | A | 7/1993 | Polednak et al. |
| 5,249,347 | A | 10/1993 | Martinitz |
| 5,258,244 | A | 11/1993 | Hall et al. |
| 5,263,204 | A | 11/1993 | Butsch |
| 5,265,276 | A | 11/1993 | Kimberly, Jr. |
| 5,291,880 | A | 3/1994 | Almovist et al. |
| 5,315,718 | A | 5/1994 | Barson et al. |
| 5,321,349 | A | 6/1994 | Chang |
| 5,331,684 | A | 7/1994 | Baril et al. |
| D354,736 | S | 1/1995 | Hallett et al. |
| 5,416,922 | A | 5/1995 | Horvat et al. |
| 5,467,479 | A | 11/1995 | Mattes |
| 5,469,578 | A | 11/1995 | Mattes |
| 5,471,678 | A | 12/1995 | Dor |
| D366,069 | S | 1/1996 | Mowrey |
| D368,429 | S | 4/1996 | Serio, Jr. |
| 5,506,730 | A | 4/1996 | Morley et al. |
| 5,551,094 | A | 9/1996 | Navone |
| 5,555,569 | A | 9/1996 | Lane |
| 5,570,002 | A | 10/1996 | Castleman |
| 5,572,749 | A | 11/1996 | Ogden |
| 5,581,819 | A | 12/1996 | Garneau |
| 5,581,821 | A | 12/1996 | Nakano |
| 5,601,852 | A | 2/1997 | Seemann |
| 5,603,117 | A | 2/1997 | Hudner, Jr. et al. |
| 5,603,638 | A | 2/1997 | Brown et al. |
| 5,608,919 | A | 3/1997 | Case |
| D381,631 | S | 7/1997 | Hallett et al. |
| 5,650,240 | A | 7/1997 | Rogers |
| D383,438 | S | 9/1997 | Gerber et al. |
| 5,667,291 | A | 9/1997 | Caplan et al. |
| 5,675,754 | A | 10/1997 | King et al. |
| 5,683,831 | A | 11/1997 | Baril et al. |
| 5,687,427 | A | 11/1997 | Lamattina et al. |
| 5,720,040 | A | 2/1998 | Simone |
| 5,752,276 | A | 5/1998 | Baudou et al. |
| 5,752,280 | A | 5/1998 | Hill |
| 5,754,445 | A | 5/1998 | Jouper et al. |
| 5,794,272 | A | 8/1998 | Workman et al. |
| 5,813,048 | A | 9/1998 | Thom |
| 5,831,198 | A | 11/1998 | Turley et al. |
| 5,835,324 | A | 11/1998 | Hatton |
| 5,845,341 | A | 12/1998 | Barthold et al. |
| 5,857,599 | A | 1/1999 | Palmer |
| 5,870,166 | A | 2/1999 | Chang et al. |
| 5,898,291 | A | 4/1999 | Hall |
| 5,898,472 | A | 4/1999 | Oshikawa |
| 5,898,949 | A | 5/1999 | Barthold et al. |
| 5,901,369 | A | 5/1999 | Pilney |
| 5,903,764 | A | 5/1999 | Shyr et al. |
| 5,905,560 | A | 5/1999 | Daniel |
| 5,914,585 | A | 6/1999 | Grabon |
| 5,914,816 | A | 6/1999 | Soto et al. |
| 5,945,806 | A | 8/1999 | Faulk |
| 5,973,477 | A | 10/1999 | Chang |
| 5,977,656 | A | 11/1999 | John |
| 5,986,437 | A | 11/1999 | Lee |
| 5,987,640 | A | 11/1999 | Ryder |
| 6,014,013 | A | 1/2000 | Suppanz et al. |
| 6,025,696 | A | 2/2000 | Lenhart et al. |
| 6,032,297 | A | 3/2000 | Barthold et al. |
| 6,046,514 | A | 4/2000 | Rouillard et al. |
| 6,081,931 | A | 7/2000 | Burns et al. |
| 6,087,035 | A | 7/2000 | Rogers et al. |
| 6,125,477 | A | 10/2000 | Crippa et al. |
| 6,137,280 | A | 10/2000 | Ackermann et al. |
| 6,198,642 | B1 | 3/2001 | Kociecki et al. |
| 6,221,522 | B1 | 4/2001 | Zafred et al. |
| 6,223,077 | B1 | 4/2001 | Schweizer et al. |
| 6,236,187 | B1 | 5/2001 | Chen |
| 6,246,215 | B1 | 6/2001 | Stanesti |
| 6,247,205 | B1 | 6/2001 | Damadian et al. |
| 6,265,846 | B1 | 7/2001 | Flechsig et al. |
| 6,271,646 | B1 | 8/2001 | Evers et al. |
| 6,292,952 | B1 | 9/2001 | Watters et al. |
| 6,366,061 | B1 | 4/2002 | Carley et al. |
| 6,366,333 | B1 | 4/2002 | Yamamoto et al. |
| 6,370,050 | B1 | 4/2002 | Peng et al. |
| 6,376,938 | B1 | 4/2002 | Williams |
| 6,396,391 | B1 | 5/2002 | Binder |
| 6,457,179 | B1 | 10/2002 | Prendergast |
| 6,459,175 | B1 | 10/2002 | Potega |
| 6,472,776 | B1 | 10/2002 | Soto et al. |
| 6,476,581 | B2 | 11/2002 | Lew |
| 6,485,852 | B1 | 11/2002 | Miller et al. |
| 6,492,050 | B1 | 12/2002 | Sammes |

(56) References Cited

U.S. PATENT DOCUMENTS 6,530,026 B1 3/2003 Bard
6,539,484 B1 3/2003 Cruz
6,541,879 B1 4/2003 Wright
6,608,463 B1 8/2003 Kelly et al.
6,627,339 B2 9/2003 Haltiner
6,628,011 B2 9/2003 Droppo et al.
6,633,823 B2 10/2003 Bartone et al.
6,640,346 B2 11/2003 Dufresne
6,662,370 B1 12/2003 Buchanan, Jr.
6,690,585 B2 2/2004 Betts
6,694,270 B2 2/2004 Hart
6,703,722 B2 3/2004 Christensen
6,707,284 B2 3/2004 Lanni
6,828,695 B1 12/2004 Hansen
6,831,848 B2 12/2004 Lanni
6,862,748 B2 3/2005 Prendergast
6,925,361 B1 8/2005 Sinnock
6,957,449 B2 10/2005 Prendergast
6,968,575 B2 11/2005 Durocher
6,981,863 B2 1/2006 Renault et al.
6,985,799 B2 1/2006 Zalesski et al.
7,001,682 B2 2/2006 Haltiner
7,002,265 B2 2/2006 Potega
7,013,491 B2 3/2006 Ferrara
D519,085 S 4/2006 Gull et al.
7,036,028 B2 4/2006 Zalesski
7,071,660 B2 7/2006 Xu et al.
7,076,592 B1 7/2006 Ykema
7,105,946 B2 9/2006 Akiyama et al.
7,124,449 B2 10/2006 Sutter et al.
7,166,937 B2 1/2007 Wilson et al.
7,170,193 B2 1/2007 Ferre
7,178,175 B2 2/2007 Rogers et al.
D538,643 S 3/2007 Babbino et al.
7,188,003 B2 3/2007 Ransom et al.
7,203,849 B2 4/2007 Dove
7,212,407 B2 5/2007 Beihoff et al.
7,219,370 B1 5/2007 Teetzel et al.
7,226,681 B2 6/2007 Florence et al.
7,227,278 B2 6/2007 Realmuto et al.
7,235,321 B2 6/2007 Sarkar et al.
7,242,115 B2 7/2007 Liu
7,243,243 B2 7/2007 Gedeon
7,256,516 B2 8/2007 Buchanan et al.
7,274,175 B2 9/2007 Manolescu
D556,678 S 12/2007 Weinstein et al.
7,385,373 B2 6/2008 Doruk et al.
7,388,349 B2 6/2008 Elder et al.
7,392,143 B2 6/2008 Jayabalan et al.
7,408,794 B2 8/2008 Su
7,418,738 B2 9/2008 Prendergast
7,436,687 B2 10/2008 Patel
7,444,445 B2 10/2008 Kubo et al.
7,444,683 B2 11/2008 Prendergast et al.
7,506,179 B2 3/2009 Templeton
D592,592 S 5/2009 Woon
7,531,915 B2 5/2009 Wang et al.
7,541,693 B2 6/2009 Huang et al.
7,590,684 B2 9/2009 Herrmann
7,595,815 B2 9/2009 Donovan et al.
7,618,260 B2 11/2009 Daniel et al.
7,631,365 B1 12/2009 Mahan
7,646,107 B2 1/2010 Smith
7,674,543 B2 3/2010 Chiang et al.
7,675,758 B2 3/2010 Artusi et al.
7,683,575 B2 3/2010 Berdichevsky et al.
7,701,082 B2 4/2010 Lazarovich et al.
7,746,029 B2 6/2010 Toya
7,770,239 B1 8/2010 Goldman et al.
7,778,940 B2 8/2010 Mazzarella
7,808,122 B2 10/2010 Menas et al.
7,810,168 B2 10/2010 Reed et al.
7,814,348 B2 10/2010 Krajcovic et al.
7,834,479 B2 11/2010 Capp et al.
7,838,142 B2 11/2010 Scheucher
7,844,370 B2 11/2010 Pollack et al.
7,847,532 B2 12/2010 Potter et al.
7,849,341 B2 12/2010 Sugiyama
7,855,528 B2 12/2010 Lee
7,873,844 B2 1/2011 Diab et al.
7,928,720 B2 4/2011 Wang
D640,192 S 6/2011 Robinson et al.
8,020,220 B2 9/2011 Mcelroy et al.
D646,233 S 10/2011 Reddering
D646,639 S 10/2011 Garza
8,073,554 B2 12/2011 Vezza et al.
8,086,281 B2 12/2011 Rabu et al.
8,103,892 B2 1/2012 Krajcovic
8,106,537 B2 1/2012 Casey et al.
8,129,938 B2 3/2012 Lu et al.
8,138,631 B2 3/2012 Allen et al.
8,140,194 B2 3/2012 Iino et al.
8,164,217 B1 4/2012 Miller
8,178,999 B2 5/2012 Burger et al.
8,193,661 B2 6/2012 Jagota et al.
8,255,090 B2 8/2012 Frader-Thompson et al.
8,279,642 B2 10/2012 Chapman et al.
8,294,307 B2 10/2012 Tsai
8,304,122 B2 11/2012 Poshusta et al.
8,312,299 B2 11/2012 Tremel et al.
8,315,745 B2 11/2012 Creed
8,333,619 B2 12/2012 Kondo et al.
8,352,097 B2 1/2013 Crumm et al.
8,352,758 B2 1/2013 Atkins et al.
8,353,066 B2 1/2013 Rogers et al.
8,363,797 B2 1/2013 Binder
8,375,229 B2 2/2013 Saeki
8,401,709 B2 3/2013 Cherian et al.
8,425,240 B2 4/2013 Lee et al.
D682,197 S 5/2013 Leung
8,438,619 B2 5/2013 Olson
8,447,435 B1 5/2013 Miller et al.
8,455,794 B2 6/2013 Vogel
8,466,662 B2 6/2013 Nania et al.
8,476,581 B2 7/2013 Babayoff et al.
8,494,479 B2 7/2013 Budampati et al.
8,508,166 B2 8/2013 Marcinkiewicz et al.
8,548,607 B1 10/2013 Belz et al.
8,599,588 B2 12/2013 Adest et al.
8,611,107 B2 12/2013 Chapman et al.
8,614,023 B2 12/2013 Poshusta et al.
8,633,619 B2 1/2014 Robinson et al.
8,636,011 B2 1/2014 Strickland et al.
8,638,011 B2 1/2014 Robinson et al.
8,643,326 B2 2/2014 Campanella et al.
8,648,492 B2 2/2014 Craig et al.
8,649,914 B2 2/2014 Miller et al.
8,661,571 B1 3/2014 Teetzel et al.
8,682,496 B2 3/2014 Schweitzer, III et al.
D704,134 S 5/2014 Cullen et al.
D706,711 S 6/2014 Robinson et al.
8,739,318 B2 6/2014 Durocher
8,763,077 B2 6/2014 Oberheide et al.
8,775,828 B2 7/2014 Coonan et al.
8,775,846 B2 7/2014 Robinson et al.
8,781,640 B1 7/2014 Miller
8,788,106 B2 7/2014 Stothers et al.
8,796,888 B2 8/2014 Rice et al.
8,826,463 B2 9/2014 Teetzel et al.
8,829,713 B2 9/2014 Ishigaki et al.
8,849,471 B2 9/2014 Daniel et al.
8,853,891 B2 10/2014 Soar
8,854,389 B2 10/2014 Wong et al.
8,890,474 B2 11/2014 Kim et al.
D719,509 S 12/2014 Shishikura et al.
8,901,774 B2 12/2014 Yan et al.
8,913,406 B2 12/2014 Guthrie et al.
D722,961 S 2/2015 Lin et al.
8,970,176 B2 3/2015 Ballatine et al.
8,984,665 B2 3/2015 Celona et al.
9,041,349 B2 5/2015 Bemmel et al.
9,043,617 B2 5/2015 Miki
9,093,862 B2 7/2015 Dennis et al.
9,101,175 B2 8/2015 Redpath et al.

(56) References Cited

U.S. PATENT DOCUMENTS 9,142,957 B2 9/2015 Malmberg et al.
9,158,294 B2 10/2015 Carralero et al.
9,190,673 B2 11/2015 Venkataraman et al.
9,203,302 B2 12/2015 Kelly
9,207,735 B2 12/2015 Khaitan et al.
9,216,523 B2 12/2015 Monforte, II et al.
9,247,779 B1 2/2016 Aloumanis et al.
9,307,803 B1 4/2016 Folgar
9,337,943 B2 5/2016 Mosebrook et al.
9,343,758 B2 5/2016 Poshusta et al.
9,356,173 B2 5/2016 Okandan et al.
9,364,975 B2 6/2016 Preisler et al.
9,413,181 B2 * 8/2016 Ford ...................... H02J 7/485
D766,821 S 9/2016 Chan et al.
9,450,274 B2 9/2016 Vo et al.
9,452,475 B2 9/2016 Armstrong et al.
9,502,894 B2 11/2016 Holmberg et al.
9,560,049 B2 1/2017 Srinivasan
9,634,491 B2 4/2017 Robinson et al.
9,698,596 B2 7/2017 Sauer et al.
9,722,435 B2 8/2017 Park
9,807,319 B2 10/2017 Teich et al.
9,848,665 B2 12/2017 Gendron et al.
D815,593 S 4/2018 Alves et al.
10,063,594 B2 8/2018 Winn et al.
10,079,488 B2 9/2018 Challancin
D836,543 S 12/2018 Sun et al.
10,165,817 B2 1/2019 Redpath et al.
10,250,134 B2 4/2019 Long et al.
10,324,290 B2 6/2019 Weller et al.
10,333,315 B2 6/2019 Robinson et al.
10,343,552 B2 7/2019 Ashcraft et al.
10,448,695 B2 10/2019 Folgar
10,542,787 B2 1/2020 Lebel et al.
D900,407 S 10/2020 Hanudel et al.
10,928,163 B2 2/2021 Zimmer
D918,830 S 5/2021 Chen
D942,394 S 2/2022 Wang
D951,861 S 5/2022 Yang
11,353,159 B2 6/2022 Roth
D959,362 S 8/2022 Reber et al.
D960,088 S 8/2022 Berrezag et al.
D972,496 S 12/2022 Qin et al.
D976,811 S 1/2023 Wang et al.
D1,016,741 S 3/2024 Wang
2002/0120979 A1 9/2002 Prendergast
2002/0135492 A1 9/2002 Reagan et al.
2003/0006905 A1 1/2003 Shieh et al.
2003/0054215 A1 3/2003 Doshi et al.
2003/0074722 A1 4/2003 Lee
2003/0085621 A1 5/2003 Potega
2003/0234729 A1 12/2003 Shen
2004/0044914 A1 3/2004 Gedeon
2004/0061380 A1 4/2004 Hann et al.
2004/0125618 A1 7/2004 De Rooij et al.
2004/0181855 A1 9/2004 Prendergast
2004/0230343 A1 11/2004 Zalesski
2004/0231030 A1 11/2004 Ferrara
2004/0239287 A1 12/2004 Batts-Gowins
2005/0037241 A1 2/2005 Schneider et al.
2005/0052610 A1 3/2005 Denney
2005/0102043 A1 5/2005 Menas et al.
2005/0217006 A1 10/2005 Sutter et al.
2005/0275372 A1 12/2005 Crowell
2006/0007562 A1 1/2006 Willey et al.
2006/0071558 A1 4/2006 Smith
2006/0101560 A1 5/2006 Ketterer et al.
2006/0127725 A9 6/2006 Sarkar et al.
2006/0143764 A1 7/2006 Reed et al.
2006/0174401 A1 8/2006 Prendergast
2006/0268221 A1 11/2006 Tracy
2006/0268222 A1 11/2006 Tracy
2006/0282939 A1 12/2006 Rogers et al.
2007/0007823 A1 1/2007 Huang et al.
2007/0078230 A1 4/2007 Lai
2007/0083967 A1 4/2007 Crossman et al.
2007/0141424 A1 6/2007 Armstrong et al.
2007/0184339 A1 8/2007 Scheucher
2007/0192933 A1 8/2007 Kam
2007/0214537 A1 9/2007 Durocher et al.
2007/0222301 A1 9/2007 Fadell et al.
2007/0257654 A1 11/2007 Krajcovic et al.
2007/0260337 A1 11/2007 Sugiyama
2008/0024007 A1 1/2008 Budampati et al.
2008/0130321 A1 6/2008 Artusi et al.
2008/0176608 A1 7/2008 Budampati et al.
2008/0184462 A1 8/2008 Prendergast
2008/0189836 A1 8/2008 Goodhand et al.
2008/0263752 A1 10/2008 Solinsky et al.
2008/0269953 A1 10/2008 Steels et al.
2008/0305839 A1 12/2008 Karaoguz et al.
2009/0023053 A1 1/2009 Berdichevsky et al.
2009/0079263 A1 3/2009 Crumm et al.
2009/0083890 A1 4/2009 Dempsey et al.
2009/0091310 A1 4/2009 Levenson et al.
2009/0133179 A1 5/2009 Aguero et al.
2009/0144872 A1 6/2009 Lebel et al.
2009/0178740 A1 7/2009 Lenze et al.
2009/0222978 A1 9/2009 Kenneth
2009/0243390 A1 10/2009 Oto
2009/0271642 A1 10/2009 Cheng et al.
2010/0001689 A1 1/2010 Hultman et al.
2010/0012692 A1 1/2010 Harris et al.
2010/0064405 A1 3/2010 Mcgovern
2010/0076615 A1 3/2010 Daniel et al.
2010/0083413 A1 4/2010 Mcgovern
2010/0134077 A1 6/2010 Krajcovic
2010/0175172 A1 7/2010 Dempsey et al.
2010/0229286 A1 9/2010 Ahlgren et al.
2010/0280676 A1 11/2010 Pabon et al.
2010/0282910 A1 11/2010 Stothers et al.
2010/0295381 A1 11/2010 Burger et al.
2010/0299814 A1 12/2010 Celona et al.
2011/0006603 A1 1/2011 Robinson et al.
2011/0007491 A1 1/2011 Robinson et al.
2011/0026282 A1 2/2011 Chapman et al.
2011/0031911 A1 2/2011 Marcinkiewicz et al.
2011/0031958 A1 2/2011 Wang
2011/0071707 A1 3/2011 Crumm et al.
2011/0094018 A1 4/2011 Rogers et al.
2011/0121810 A1 5/2011 Tsai
2011/0123884 A1 5/2011 Ernst et al.
2011/0154619 A1 6/2011 Ward et al.
2011/0184585 A1 7/2011 Matsuda et al.
2011/0192857 A1 8/2011 Rothbaum et al.
2011/0193416 A1 8/2011 Campanella et al.
2011/0198933 A1 8/2011 Ishigaki et al.
2011/0234000 A1 9/2011 Yan et al.
2011/0261601 A1 10/2011 Chapman et al.
2011/0277222 A1 11/2011 Garneau et al.
2011/0278957 A1 11/2011 Eckhoff et al.
2012/0002046 A1 1/2012 Rapoport et al.
2012/0007432 A1 1/2012 Rice et al.
2012/0092903 A1 4/2012 Nania et al.
2012/0098334 A1 4/2012 Holmberg et al.
2012/0144565 A1 6/2012 Huh
2012/0144567 A1 6/2012 Huh
2012/0167281 A1 7/2012 Gennrich et al.
2012/0174294 A1 7/2012 Sackett
2012/0204331 A1 8/2012 Lebel et al.
2012/0205976 A1 8/2012 Shih et al.
2012/0319504 A1 12/2012 Malmberg et al.
2012/0326516 A1 12/2012 Gurunathan et al.
2013/0000016 A1 1/2013 Hall et al.
2013/0038306 A1 2/2013 Kelly et al.
2013/0163302 A1 6/2013 Li et al.
2013/0191967 A1 8/2013 Harris
2013/0239303 A1 9/2013 Cotterman et al.
2013/0278216 A1 10/2013 Son et al.
2013/0293013 A1 11/2013 Templeton et al.
2014/0091623 A1 4/2014 Shippy et al.
2014/0095915 A1 4/2014 Hitchcock et al.
2014/0097685 A1 4/2014 Jun et al.
2014/0103720 A1 4/2014 Robinson et al.

(56) References Cited

U.S. PATENT DOCUMENTS

| | | | | |
|---|---|---|---|---|
| 2014/0130241 | A1 | 5/2014 | Abdollahi et al. | |
| 2014/0209377 | A1 | 7/2014 | Wang | |
| 2014/0240834 | A1 | 8/2014 | Mason | |
| 2014/0292081 | A1 | 10/2014 | Long et al. | |
| 2014/0312828 | A1 | 10/2014 | Vo et al. | |
| 2015/0137606 | A1 | 5/2015 | Adest et al. | |
| 2015/0157079 | A1 | 6/2015 | Auranen et al. | |
| 2015/0237771 | A1 | 8/2015 | Natter et al. | |
| 2015/0245682 | A1 | 9/2015 | Mcginn et al. | |
| 2015/0323945 | A1 | 11/2015 | Perier | |
| 2016/0075338 | A1 | 3/2016 | Henn | |
| 2016/0088891 | A1 | 3/2016 | Walsh et al. | |
| 2016/0094071 | A1 | 3/2016 | Nge et al. | |
| 2016/0171864 | A1 | 6/2016 | Ciaramelletti et al. | |
| 2016/0286156 | A1 | 9/2016 | Kovac | |
| 2016/0295948 | A1 | 10/2016 | Dowd et al. | |
| 2016/0329811 | A1 | 11/2016 | Du et al. | |
| 2016/0342186 | A1 | 11/2016 | Ragupathi et al. | |
| 2017/0027268 | A1 | 2/2017 | Folgar | |
| 2017/0077704 | A1 | 3/2017 | Faley et al. | |
| 2017/0089172 | A1 | 3/2017 | Zhao | |
| 2017/0192474 | A1 | 7/2017 | Robinson et al. | |
| 2017/0269460 | A1 | 9/2017 | Fagerkvist | |
| 2017/0338665 | A1 | 11/2017 | Long et al. | |
| 2018/0003989 | A1 | 1/2018 | Terada et al. | |
| 2018/0239144 | A1 | 8/2018 | Woods et al. | |
| 2018/0308397 | A1 | 10/2018 | Sugimoto et al. | |
| 2018/0353176 | A1 | 12/2018 | Shelton, IV et al. | |
| 2019/0101359 | A1 | 4/2019 | Zimmer | |
| 2019/0101772 | A1 | 4/2019 | Lowe | |
| 2019/0157885 | A1 | 5/2019 | Rippel et al. | |
| 2019/0365009 | A1 | 12/2019 | Frieder, III et al. | |
| 2020/0008508 | A1* | 1/2020 | Havola .................... | A42B 3/04 |
| 2020/0019236 | A1 | 1/2020 | Parkinson et al. | |
| 2020/0197997 | A1 | 6/2020 | Zhou et al. | |
| 2020/0205499 | A1 | 7/2020 | Draper et al. | |
| 2020/0329806 | A1 | 10/2020 | Wong | |
| 2021/0075326 | A1 | 3/2021 | Long et al. | |
| 2021/0247618 | A1 | 8/2021 | Moore et al. | |
| 2021/0315314 | A1 | 10/2021 | Teetzel et al. | |
| 2022/0071336 | A1 | 3/2022 | Franzino et al. | |

FOREIGN PATENT DOCUMENTS

| | | | |
|---|---|---|---|
| DE | 630473 | C | 5/1936 |
| DE | 8138228 | U1 | 6/1983 |
| EP | 0335316 | A2 | 10/1989 |
| EP | 1966850 | A2 | 9/2008 |
| EP | 2230743 | A2 | 9/2010 |
| GB | 1114214 | A | 5/1968 |
| GB | 2464749 | A1 | 5/2010 |
| GB | 6213625 | | 6/2022 |
| GB | 6213626 | | 6/2022 |
| GB | 6213628 | | 6/2022 |
| WO | 2006126023 | A1 | 11/2006 |
| WO | 2007012785 | A1 | 2/2007 |
| WO | 2007048837 | A1 | 5/2007 |
| WO | 2007076440 | A2 | 7/2007 |
| WO | 2008072014 | A1 | 6/2008 |
| WO | 2008072015 | A1 | 6/2008 |
| WO | 2008090378 | A1 | 7/2008 |
| WO | 2011023678 | A2 | 3/2011 |
| WO | 2011046645 | A1 | 4/2011 |
| WO | 2011113280 | A1 | 9/2011 |
| WO | 2012122315 | A1 | 9/2012 |
| WO | 2013083296 | A2 | 6/2013 |
| WO | 2014165469 | A1 | 10/2014 |
| WO | 2016016445 | A2 | 4/2016 |
| WO | 2017087130 | A1 | 5/2017 |
| WO | 2018173313 | A1 | 9/2018 |
| WO | 2020109887 | A1 | 6/2020 |
| WO | 2020217089 | A1 | 10/2020 |
| WO | 2020237189 | A1 | 11/2020 |
| WO | 2022115531 | A1 | 6/2022 |

OTHER PUBLICATIONS

Alibaba.com, 5KW charger controller for wind power supply and solar cell, 2009, 3 pages.

Amazon.com: Morningstar TriStar-45 Solar Charge Controller for solar/wind generator/Wind Turbine-45 amps, 2009, 6 pages.

AU Examination Report corresponding to Application No. 2010307261, dated Jul. 23, 2013, 5 pages.

AU Examination Report corresponding to Application No. 2014248342, dated Sep. 7, 2017, 3 pages.

BA 5590 Lithium Battery, http://defense-update.com/products/b/ba5590.htm, Jul. 26, 2006, 1 page.

Battery Management Systems (BMS), 2009, www.mpoweruk.com/bms.htm., 12 pages.

Becherif, M., et al., "Advantages of variable DC bus voltage for Hybrid Electrical Vehicle", Vehicle Power and Propulsion Conference (VPPC), 2010, pp. 1-6.

Bruce et al., "Military takes aim at high battery costs", Defense Electronics, Apr. 2005, pp. 20-25.

Button, Robert M., "Intelligent Systems for Power Management and Distribution", NasaiTM-2002-211370, Feb. 2002, 12 pages.

CA Examiner's Report corresponding to Application No. 3,167,174, dated Oct. 19, 2023, 6 pages (English Translation).

CA Office Action corresponding to Application No. 2020033207, dated Jan. 23, 2023, 5 pages.

CA Office Action corresponding to Application No. 3, 138,704, dated Jan. 22, 2022, 5 pages.

Cipriano, Greg, et al., Protonex, Joint Service Power Expo, 2009, 38 pages.

Conti, M. et al., "SystemC Modeling of a Dynamic Power Management Architecture", 6 pages.

Dangora, Lisa M., et al., "Deep-Drawing Forming Trials on a Cross-Ply Thermoplastic Lamina for Helmet Preform Manufacture", Journal of Manufacturing Science and Engineering, vol. 139, No. 3, Mar. 2017, 8 pages.

Dirish, Mat, "Engineer Seeks Cure For Common Wall Warts", https://www.electronicdesign.com/markets/energy/article/21761343/engineer-seeks-cure-for-common-wall-warts, Aug. 2008, 3 pages.

Duarte, Jorge L., et al., "Three-Port Bidirectional Converter for Hybrid Fuel Cell Systems", IEEE Transactions on Power Electronics, vol. 22, No. 2, 2007, 8 pages.

Energy Harvesting Journal: Soldier-worn portable power management system, Apr. 2009, http://www.energyharvestingjournal.com/articles/soldier-worn-portable-power-management-system-00001375.asp?sessionid=1, 2 pages.

EP Extended Search Report corresponding to Application No. 10814535.0, dated Feb. 16, 2015, 6 pages.

EP Extended Search Report corresponding to Application No. 22189026, dated Jan. 23, 2023, 7 pages.

EP Extended Search Report corresponding to Application No. 22209825.3, dated Apr. 13, 2023, 4 pages.

EP Search Report corresponding to Application No. 14780196.3, dated Dec. 9, 2016, 11 pages.

EP Search Report corresponding to Application No. 16866830.9, dated Mar. 1, 2019, 9 pages.

EP Search Report corresponding to Application No. 20808866.6, dated May 3, 2022, 25 pages.

EP Supplementary Search Report corresponding to U.S. Appl. No. 21/770,744, dated Feb. 27, 2024, 2 pages.

Evans, Ian C. et al., "High power clean DC bus generation using AC-link AC to DC power voltage conversion, DC regulation, and galvanic isolation", IEEE Electric Ship Technologies Symposium, 2009, 12 pages.

Fursin, Leonid et al., "Development of Compact Variable-Voltage, Bi-Directional 100KW DC-DC Converter", 2007, 9 pages.

Galvion, "Galvion Introduces New Nerv Centr® Solopack™ II Battery at Ausa", Found online Apr. 1, 2024 at galvion.com, https://www.galvion.com/blogs/newsroom/galvion-introduces-new-nerv-centr-solopack-ii-battery-at-ausa, Reference dated Oct. 5, 2022, 1 page.

Galvion, "SoloPack II Battery", Found online Apr. 1, 2024 at galvion.com, https://www.galvion.com/products/solopack™-ji-battery, Retrieved from https://tineye.com/search/

(56) References Cited

OTHER PUBLICATIONS b4784b1681cf3548c59d008759c6a928019bf341?sort=crawl_data &order=asc&page=1, Reference dated Feb. 5, 2024, 5 pages.
Galvion, "SoloPacks", Found online Apr. 1, 2024 at facebook.com, https://www.facebook.com/galvion.solutions/posts/pfbid02MMM5ojG3PyG6Vpj5SLSbWrYZ2xYb3shEFT8R91JVns1EMJQXb8teUEwcheYJq9kwl, Reference dated May 12, 2022, 2 pages.
Garcia, Julio, "Efficiency Improvement in Autonomous Electric Vehicles using Dynamic Commutation of Energy Resources", 2009 Barcelona Forum on Ph.D. Research in Electronic Engineering, 2 pages.
Green Plug, "One Plug. One Planet", www.greenplug.us, 2009, 7 pages.
Hoffart, Fran, "New Charger Topology Maximizes Battery Charging Speed", Design Note 194, 1998, 2 pages.
Hong, Inki et al., "Power Optimization of Variable-Voltage Core-Based Systems", IEEE Transactions on Computer-Aided Design of Integrated Circuits and Systems, vol. 18, No. 12, Dec. 1999, pp. 1702-1714.
International Preliminary Report on Patentability corresponding to Application No. PCT/US2010/047757, dated Mar. 6, 2012, 16 pages.
International Preliminary Report on Patentability corresponding to Application No. PCT/US2020/033207, dated Jul. 30, 2020, 17 pages.
International Preliminary Report on Patentability corresponding to Application No. PCT/US2021/016807, dated Jul. 28, 2022, 8 pages.
International Preliminary Report on Patentability corresponding to Application No. PCT/US2022/028754, dated Nov. 23, 2023, 11 pages.
International Search Report and Written Opinion corresponding to Application No. PCT/IB2013/003041, dated Feb. 9, 2015, 12 pages.
International Search Report and Written Opinion corresponding to Application No. PCT/JP2008/066605, dated Dec. 16, 2008, 11 pages.
International Search Report and Written Opinion corresponding to Application No. PCT/US2010/047757, dated Feb. 25, 2011, 20 pages.
International Search Report and Written Opinion corresponding to Application No. PCT/US2010/41335, dated Mar. 24, 2011,11 pages.
International Search Report and Written Opinion corresponding to Application No. PCT/US2016/058922, dated Feb. 9, 2017, 6 pages.
International Search Report and Written Opinion corresponding to Application No. PCT/US2016/062863, dated Mar. 30, 2017, 6 pages.
International Search Report and Written Opinion corresponding to Application No. PCT/US2020/033207, dated Jul. 30, 2020, 18 pages.
International Search Report and Written Opinion corresponding to Application No. PCT/US2021/016807, dated Dec. 28, 2021, 11 pages.
International Search Report and Written Opinion corresponding to Application No. PCT/US2022/28754, dated Aug. 29, 2022, 12 pages.
International Search Report and Written Opinion corresponding to Application No. PCT/US2023/077642, dated Feb. 28, 2024, 19 pages.
International Search Report and Written Opinion corresponding to Application No. PCTUS2014/032455, dated Sep. 8, 2014, 12 pages.
Jai, C.S., Green Technology, "Green Plug Partners with Wipower for Advanced Wireless Power Systems", http://green.tmcnet.com/topics/green/articles/57729-green-plug-partners-with-wipower-advanced-wireless-power.htm, Jun. 10, 2009, 3 pages.
Karlsson, et al., "DC Bus Voltage Control for a Distributed Power System", IEEE Transactions on Power Electronics, Nov. 2003, vol. 18, No. 6, pp. 1405-1412.
Khan, F.H., et al., www.ietdl.org, IET Power Electronics, Bi-directional power manager management and fault tolerant feature in a −5KW multivlevel dc-dc converter with modular architecture, 2009, vol. 2, No. 5, pp. 595-604.
Kriechenbauer et al., "Deep Drawing with Superimposed Low-Frequency Vibrations on Servo-Screw Presses", Procedia Engineering, vol. 81, 2014, pp. 905-913.
Lu et al., "A Novel Surface Texture Shape for Directional Friction Control", Tribology Letters, 2018, vol. 66, No. 51, 13 pages.
Merkle, Matthew Alan, "Variable Bus Voltage Modeling for Series Hybrid Electric Vehicle Simulation", Thesis submitted to the faculty of Virginia Polytechnic Institute and State University, Dec. 1997, 33 pages.
Nihon Kohden: Products-Monitoring, Smart Cable Technology, 2004, www.nkusa.com/prod-monitor-smart-cable.htm, 1 page.
Ocean Server Technology, Inc., "Intelligent Battery and Power System", May 2008, 4 pages.
Ocean Server Technology, Inc., Smart Li-Ion Packs, Integrated Charges, Ultra High Efficiency DC-DC Converters, Integrate Battery Power or Backup, Fully Engineered (plug and run) and 95 to 25,000+ Watt-hour Clusters, 2007, 4 pages.
Paneltronics, "What is Power Sign?", Multiplex Distribution Systems, 2006, www.paneltronics.comlip.asp?op=Multiplex%20Distributions%20Systems, 2 pages.
Patel et al., "Parametric Analysis of Deep Drawing Process for Hemisphere Dome Shape of Steel AISI 1023", Journal of Basic and Applied Engineering Research, vol. 1, No. 2, Oct. 2014, pp. 9-16.
Podesser, Peter, "Portable power management for soldiers: Fuel cell hybrid system is lighter, safer", Military Embedded Systems, May 2009, 7 pages.
Reuters, "Protonex to Launch Soldier-Worn Portable Power Management Systems", Feb. 2009, http://www.reuters.com/article/pressRelease/idUS159777+17-Feb-2009+BW20090217, 3 pages.
Reyneri, et al., "A redundant power bus for distributed power management for a modular satellite", IAC-09.C3.2.8, 2009, 8 pages.
Richter, Wolfgang, "Chip for saving power", Aug. 2007, 2 pages.
Rothman, Wilson, "New Honeywell HDMI Cable Heals Self, But At What Cost?", gizmodo.com/295076/new-honeywell-hdmi-cable-heals-self-but-at-what-cost-0295076, Aug. 2007, 3 pages.
SFC Energy Press Release, "SFC receives commercial order for portable fuel cells", Feb. 11, 2008, Retrieved from Internet: www.sfc.com/index2.php option=com_pressreleasees&Itemid=467&id=1050&lang=en&pop-1&page=0, 1 page.
SFC smart fuel cell launches joint power manager, Jun. 2009, http:/fuelcellsworks.com/news/2009/06/04/sfc-smart-fuel-cell-launches-joint-power-manager, 4 pages.
SFC Smart Fuel Cell, replay.waybackmachine.org/20090122152343/http://www.sfc.com/en/about-sfc.html, 2009, 1 page.
Singh, et al., "Fuzzy Logic-Based Solar Charge Controller For Microbatteries", Conference Record of the Twenty-Eighth IEEE Photovoltaic Specialists Conference, 2000, pp. 1726-1729.
The SFC Power Manager—The technology, http://web.archive.org/web/20090312005238/http:/www.sfc.com/en/man-portable-technology-power-manager.html, 2009, 2 pages.

* cited by examiner

HELMET-MOUNTED POWER SYSTEM

CROSS-REFERENCE TO RELATED APPLICATION

The present application is a continuation of and claims the benefit of U.S. Non-Provisional patent application Ser. No. 17/879,872 filed Aug. 3, 2022, which claims the benefit and priority of U.S. Provisional Patent Application No. 63/230,309 filed Aug. 6, 2021, each of which is incorporated herein by reference.

BACKGROUND OF THE INVENTION

1.1 Field of the Invention

The exemplary, illustrative, technology herein relates to systems, software, and methods for providing electrical power and communications to helmet-mounted accessories.

The technology herein has applications in the areas of power and communication systems for military and civilian helmets and other head gear.

1.2 The Related Art

The technology herein has applications in the areas of helmet power systems that provide electrical power to powered accessory devices that are attached to a helmet. More specifically, the technology herein has application in the area of power systems that include at least some components that are mounted on a helmet to which powered accessory devices are attached.

Conventional helmet power systems have problems. These systems include power management components, powered accessory interfaces, power distribution busses, wiring, and circuitry, at least some of which are difficult to remove or reconfigure.

SUMMARY OF THE INVENTION

A proposed helmet power system solves at least some problems associated with the conventional helmet power systems. In one example, a proposed helmet power system can be removably attached to and removably mounted on a helmet. For this purpose, the power system includes one or more power sources, power management components, powered accessory interfaces, and cables or the like, all of which are attachable to and removable from the helmet. In examples, the power system is attachable to features that are built into the helmet; for example to a rail system of the helmet, with an adjustable attachment system that interfaces with the features. The adjustable attachment system is adjustable so that it can be used to attach the power system to different sizes of helmets. The power system also can be added to an existing helmet, removed from the helmet, and moved to a different helmet.

The proposed power system is also scalable and reconfigurable. In more detail, a user can add or remove powered accessory interfaces to the power system, either before the power system is attached to a helmet or while the power system is in place on the helmet. In examples, the powered accessory interfaces can include combination power and communication interfaces. In some embodiments, a powered accessory interface is connected to a cable which, in turn, is connected to the power system and both the cable and powered accessory interface can be attached to and removed from the helmet and the power system. A user also can add and remove power sources to the power system to scale an amount of available power.

In a preferred embodiment, the proposed power system includes an internal source of power. Here, the user can add one or more removable power sources to the power system to supplement the internal power source. In a particular exemplary embodiment, the user can add and remove a power module that is mountable on the power system where it is carried on the helmet along with the internal power source. The power module includes one or more removable power sources, and in some embodiments, a processor. For example, the user might add a removable power source to the power system when a powered accessory is newly connected, thereby increasing an amount of power available from the power system when a power load demand is increased. The user removes the one or more removable power sources when they are not needed or desired, or to exchange a first removable power source with a second removable power source. The internal power source provides power for the power system when the removable source of power is not present.

In some example embodiments, the proposed power system also uses power provided by a removable power source to charge the internal power source, thereby maintaining a power capacity of the internal power source. In this manner, the internal source is kept charged so that it is able to provide power to the power system when the removable power source runs low on power or is removed from the system. This is advantageous during a hot swap of a first removable power source for a second removable power source, and any time a removable power source is not present, in examples.

In still another example, the proposed power system uses power provided by an external power source that is not mounted on the power system or on the helmet, for example from a power source that is connected to a body-worn power manager or hub that is, in turn, connected to a power system over a cabled interface, or from a power source that is directly connected to the power system over the cabled interface. Power provided by an external power source can be used to power accessories on the helmet and to charge one or both of the first, internal, power source and a second, removable, power source that is connected to and mounted on the power system. In examples, external power sources that may be connected directly to the power system or to the power system via a power manager or hub include a battery, a source of vehicle power, an AC power source, and a non-stable power source, for example a solar blanket.

In a first, non-limiting, example, the technology disclosed herein includes a helmet system that includes a helmet and a unit attached to the helmet. The unit includes a processor, a first power source for providing first power, a first interface attachable to an accessory device, and a second interface for receiving second power from a second power source. The unit selectively provides one of the first power and the second power to the accessory device under the control of the processor. In some embodiments, the unit is removably attachable to the helmet by a user. In some embodiments, the second power source is part of a power module and the power module is removably attachable to the second interface by a user. In some embodiments, the helmet system include means for attaching the unit to the helmet. In some embodiments, the processor enables the second power to be provided to the accessory device if the second power is available, and otherwise enables the first power to be provided to the accessory device. In some embodiments, the processor determines an amount of power available from the first or second power source, and if the amount of power is less than a threshold, enables a low power indicator on the accessory device. In some embodiments, the unit includes a communication interface and the processor receives information from the accessory device and the second power source and transmits the information to a user-worn hub via the communication interface.

In a second, non-limiting, example embodiment, the technology disclosed herein includes a unit. The unit includes means for attaching the unit to a helmet, a processor, a first power source for providing first power, a first interface that is attachable to an accessory device, and a second interface for receiving second power from a second power source. The unit selectively provides one of the first power and the second power to the accessory device under the control of the processor. In some embodiments, the unit is removably attachable to the helmet by a user. In some embodiments, the second power source is removably attachable to the second interface by a user. In some embodiments, the processor enables the second power to be provided to the accessory device if the second power is available, and otherwise enables the first power to be provided to the accessory device. In some embodiments, the processor determines an amount of first power or second power available from the first or second power source, and if the amount is less than a threshold, enables a low power indicator on the accessory device. In some embodiments, the unit includes a communication interface, and the processor receives information from the accessory device and the second power source and transmits the information to a user-worn hub via the communication interface.

In a third, non-limiting, example, the technology disclosed herein includes a power module that includes means for attaching the power module to a unit on a helmet. The unit on the helmet includes a first power source for providing first power. The power module includes a second power source for providing second power and a processor for determining an operating state of the second power source. The processor communicates the operating state to the unit when the power module is attached to the unit and thereby enables the unit to selectively provide one of the first power and the second power to an accessory device attached to the unit. In some embodiments, the power module is removably attachable to the unit by a user.

These and other aspects and advantages will become apparent when the Description below is read in conjunction with the accompanying Drawings. Please also note that the original claims as well as any other features of the subject technology may be parsed, combined, separated and otherwise presented in any combination The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. The features of the present invention will best be understood from a detailed description of the invention and example embodiments thereof selected for the purposes of illustration and shown in the accompanying drawings as described below.

FIG. 6 is a flow chart that describes a method of operation of the power system in

FIG. 1.

DESCRIPTION OF SOME EMBODIMENTS OF THE INVENTION

1.3 Item Number List

Figure 1:
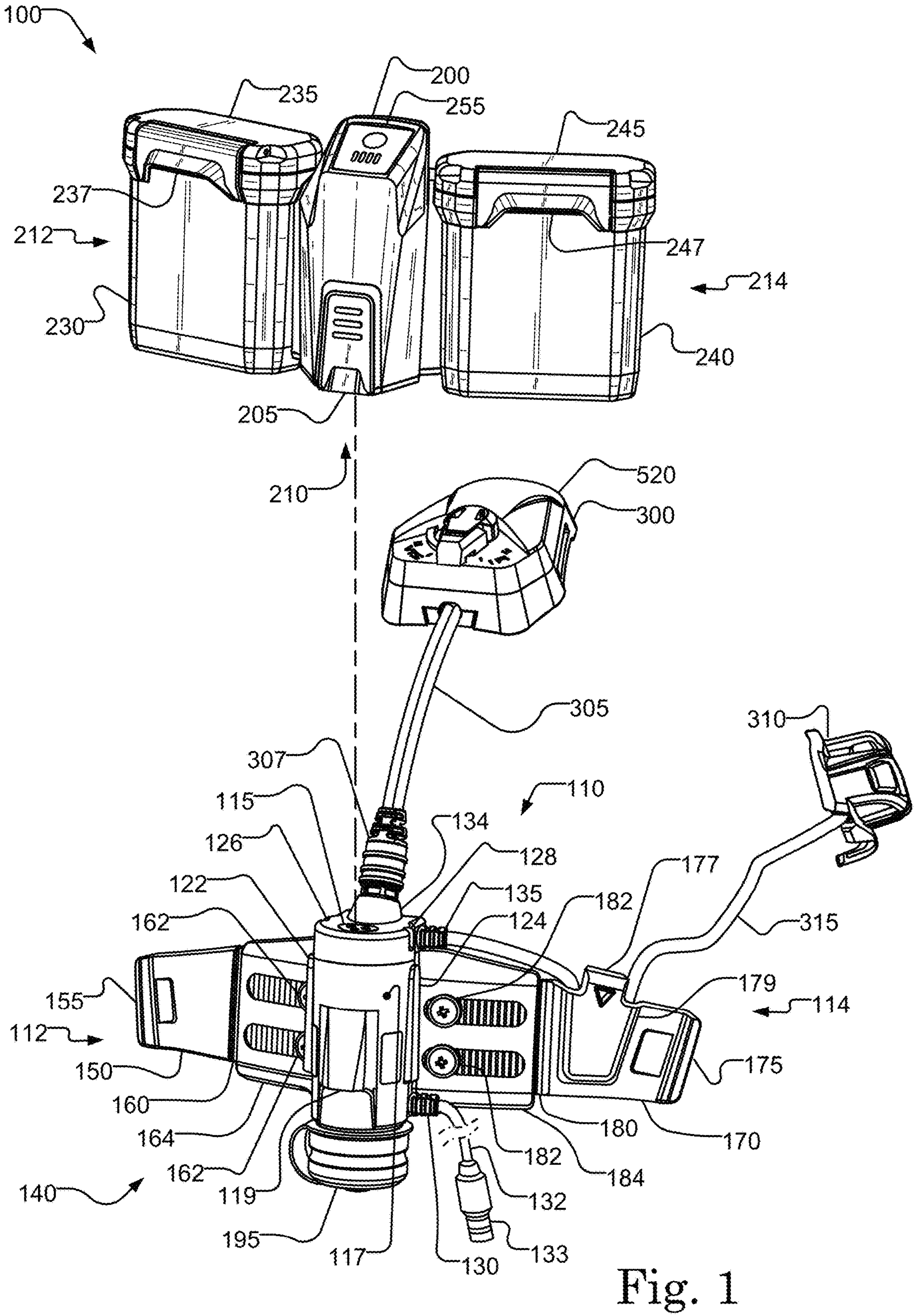
FIG. 1 is a rear perspective view of a novel power system, according to the technology described herein.

The following item numbers are used throughout, unless specifically indicated otherwise.

| # | DESCRIPTION |
|---|---|
| 100 | Power system |
| 110 | Base unit |
| 112 | First (left) side of base unit |
| 114 | Second (right) side of base unit |
| 115 | Power module electrical interface |
| 117 | Interface surface |
| 119 | Interface ramp |
| 122 | Left interface protrusion |
| 124 | Right interface protrusion |
| 126 | Left interface slot |
| 128 | Right interface slot |
| 130 | External power cable interface |
| 132 | External power cable |
| 133 | External power source interface |
| 134 | Strobe accessory cable interface |
| 135 | Vision system accessory cable interface |
| 140 | Adjustable attachment system |
| 150 | Left attachment clip |
| 155 | Rail interface |
| 160 | Adjustable connector |
| 162 | Adjustment screw |
| 164 | Connector housing |
| 170 | Right attachment clip |
| 175 | Rail interface |
| 177 | Cable clip |
| 179 | Cable pocket |
| 180 | Adjustable connector |
| 182 | Adjustment screw |
| 184 | Connector housing |

-continued

| # | DESCRIPTION |
|---|---|
| 195 | Base unit cover |
| 200 | Power module |
| 205 | Power module release |
| 207 | Release catch bar |
| 210 | Base unit interface |
| 212 | First (left) side of power module |
| 214 | Second (right) side of power module |
| 215 | Base unit electrical interface |
| 216 | Electrical interface gasket |
| 217 | Right side interface surface |
| 219 | Left side interface surface |
| 222 | Left protrusion groove |
| 224 | Right protrusion groove |
| 226 | Left slot protrusion |
| 228 | Right slot protrusion |
| 230 | First removable power source compartment |
| 235 | First removable power source compartment cover |
| 237 | Release |
| 240 | Second removable power source compartment |
| 245 | Second removable power source compartment cover |
| 247 | Release |
| 255 | Power level indicator |
| 300 | Strobe interface |
| 305 | Strobe interface cable |
| 307 | Strobe cable plug |
| 310 | Vision system interface |
| 315 | Vision system interface cable |
| 400 | Helmet system |
| 405 | Helmet system |
| 410 | Helmet |
| 415 | Rail system |
| 420 | Left rail |
| 425 | Attachment clip receptor |
| 430 | Right rail |
| 432 | Threaded fastener |
| 433 | Threaded fastener |
| 435 | Attachment clip receptor |
| 437 | Cable run |
| 439 | Cable run |
| 440 | Front accessory connection plate |
| 445 | Front accessory mounting system |
| 450 | Strobe attachment pad |
| 460 | Rear (first) side of helmet |
| 465 | Front (second) side of helmet |
| 500 | Vision system (example of front accessory) |
| 510 | Vision system cable |
| 515 | Vision system interface plug |
| 520 | Strobe |
| 530 | Task light |
| 600 | Processor |
| 605 | Memory |
| 610 | Communication network |
| 620 | Power bus |
| 625 | DC/DC power converter |
| 627 | Input port |
| 629 | Output port |
| 630 | Power multiplexer (MUX) |
| 632 | Input side |
| 634 | Output side |
| 640 | Additional accessory interface |
| 645 | Additional accessory interface cable |
| 647 | Additional accessory cable interface |
| 650 | Internal power source |
| 657 | Internal power channel |
| 660 | Extended power interface |
| 662 | External power interface |
| 665 | Removable power source power sensor |
| 667 | Extended power unit power channel |
| 670 | External power source |
| 675 | External power connection detect |
| 677 | External power channel |
| 680 | Internal charging circuit |
| 685 | Secondary charging circuit |
| 690 | Data router |
| 693 | USB end point |
| 695 | Wireless interface |
| 710 | Electrical interface |

-continued

| # | DESCRIPTION |
|---|---|
| 720 | Power switch |
| 730 | Connection detect |
| 735 | Battery sensor |
| 740 | Removable power source |
| 745 | Removable power source |

1.4 Detailed Description of the Invention

The subject technology now will be described more fully hereinafter with reference to the accompanying drawings, in which illustrative embodiments are shown. The subject technology may, however, be embodied in many different forms and should not be construed as limited to the embodiments set forth herein; rather, these embodiments are exemplary only.

As used herein, the term "and/or" includes any and all combinations of one or more of the associated listed items. Further, the singular forms of the articles "a", "an", and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

1.4.1 Example Power System

FIG. 1 shows an inventive power system 100. The power system 100 includes various components. These components include a base unit 110, a strobe interface 300, a vision system interface 310 and an external power source interface 133. The power system 100 also includes an adjustable attachment system 140 and a power module 200.

The base unit 110 includes a first side 112, shown on the left of the figure, and a second side 114, shown on the right of the figure. The base unit 110 also includes a power module electro-mechanical interface 115. In one embodiment, the interface 115 includes a cylindrically shaped outer surface 117. The base unit 110 further includes an external power cable interface 130, a strobe accessory cable interface 134, and a vision system accessory cable interface 135. In additional embodiments, the base unit 110 can include more or fewer accessory cable interfaces. In some embodiments, the base unit 110 does not include an external power cable interface 130.

The strobe interface 300 is electrically connected to a strobe cable 305, which includes a strobe cable plug 307. The strobe cable plug 307 is electrically and mechanically connected to the strobe accessory cable interface 134. The strobe cable plug 307 is also removably connectable to the accessory cable interface 134. In embodiments, the base unit includes a strobe cable plug dust cover, not shown, that can used to cover and protect the strobe accessory interface 134 when the strobe cable plug 307 is removed. In alternative embodiments, the strobe cable 305 is fixedly connected to the strobe accessory cable interface 134.

The vision system interface 310 is electrically connected to a vision system cable 315 which, in turn, is electrically connected to a vision system accessory cable interface 135. As shown, the vision system cable 315 is non-removably connected to the vision system interface 135. In alternative embodiments, the vision system cable 315 is removably connected to the vision system accessory cable interface 135 and may include a cable plug (not shown) for connecting the cable 315 to the vision system accessory cable interface 135. In further exemplary embodiments, the power system includes more or fewer interfaces, each of which may be attached to the base unit 100 via a cable and cable interface.

The external power source interface 133 is electrically connected to an external power cable 132. The external power cable 132 is electrically connected to the external power cable interface 130. As shown, the external power cable 132 is non-removably connected to the external power cable interface 130. In alternative embodiments, the external power cable 132 is removably connected to the external power cable interface 130 and may include a cable plug (not shown) for connecting the power cable 132 to the external power cable interface 130.

The adjustable attachment system 140 includes a first attachment clip 150, shown on the left of the figure, and a second attachment clip 170 shown on the right of the figure. The first attachment clip 150 includes a rail interface 155. An adjustable connector 160 is connected to the first attachment clip 150 and is partially disposed within a connector housing 164 which is attached to the first side 112 of the base unit 110. The adjustable connector 160 is also disposed between the left attachment clip 150 and the base unit 110. The adjustable connector 160 is movable relative to the connector housing 164 and the base unit 110. Two adjustment screws 162 hold the adjustable connector 160 in place within the connector housing. The adjustment screws 162 can be loosened to allow the adjustable connector 160 to move relative to the connector housing and to the base unit 110, thereby allowing the attachment clip 155 to be moved closer to or further from the base unit. The two adjustment screws can be tightened to hold the adjustable connector 160 and the attachment clip in a desired position.

The second attachment clip 170 includes a rail interface 175, a cable clip 177, and a cable pocket 179. An adjustable connector 180 is connected to the second clip 170 and is disposed within a connector housing 184 disposed on the second side 114 of the base unit 110. The adjustable connector 180 is also disposed between the second attachment clip 170 and the base unit 110. Two adjustment screws 182 are disposed to hold the adjustable connector in a fixed position within the connector housing 184. The adjustment screws 182 can be loosened to allow the attachment clip 170 to be moved to a desired position and can be tightened to hold the adjustable connector 180 and the attachment clip 170 in the desired position.

Each adjustable connector 160, 180 is attached to base unit 110 with a connector housing 164, 184 on the base unit. Each adjustable connector 160, 180 can be moved relative to the base unit 110 to increase or decrease a distance between the base unit 110 and an attachment clip 150 or 170 that is attached to a corresponding adjustable connector. In an exemplary embodiment, the connector housing includes a holding mechanism, for example adjustment screws 162, 182 or, alternatively, another known releasable adjustable connector holding mechanism (not shown), for example a latch or a lever-actuated holding mechanism. A user releases the holding mechanism, adjusts an adjustable connector (160 or 180) held by the holding mechanism to move a corresponding attachment clip (150 or 170) to desired position closer to or further away from base unit 110, and re-engages the holding mechanism to hold the attachment clip in the desired position. In this manner, a user is able to adjust the spacing between attachment clips to attach base unit 110 to helmets having different sizes.

In some embodiments, the adjustable connectors 160, 180 are additionally or alternatively flexible. For example, the adjustable connectors may be formed from one or elastically deformable materials that elastically elongate when subjected to a tension force and that retract when the tension force is released. For example, the adjustable connectors can be made from a woven or knitted fabric structure that includes one or more elastically deformable materials or may be formed from a sheet of deformable material. Alternatively or in addition, an adjustable connector may be formed to include one or more mechanical structures, e.g. one or more corrugations, which allow it to lengthen under tension. The elastically deformable material and/or mechanical structures allow the associated attachment clips 150, 170 to be displaced relative to the base unit 110, thereby stretching or elongating the non-rigid members 160, 180 without necessarily loosening or tightening adjustment screws 162, 182. The stretching of the adjustable connectors 160, 180 correspondingly applies a tension force between the base unit 110 and each attachment clip 150, 170.

The base unit 110 includes a base unit cover 195. The base unit cover 195 can be removed to expose a base unit internal power source housed in a base unit internal power source compartment, not shown. The base unit power source compartment is configured to house the base unit internal power source, not shown. A user can remove the base unit cover 195 to remove or replace the base unit internal power source. In embodiments, the base unit internal power source includes an energy storage device, for example a battery comprising a primary cell or a rechargeable cell, or a supercapacitor. A base unit internal power source energy storage device can include a rechargeable cell with an integrated battery controller or a cell without an integrated battery controller. Exemplary base unit power source energy storage devices include a CR123 cell, AA cell, or AAA cell. The base unit cover 195 is removably attached to base unit 110. The base unit cover 195 is configured to enclose the base unit battery compartment, provide a watertight seal, and to hold a base unit internal power source in place when the base unit battery compartment cover 195 is attached to base unit 110. In an exemplary embodiment, the base unit 110 is rated for 10 m immersion in water.

The power module 200 includes a release 205, a base unit interface 210, and a power level indicator 255. The power module 200 includes a first removable power source compartment 230, a first removable power source compartment cover 235, and a release 237. The power module 200 includes a second removable power source compartment 240, a second removable power source compartment cover 245, and a release 247. In example embodiments, the first removable power source compartment 230 and the second removable power source compartment 240 each house one or more removable power sources, e.g. one or more batteries, not shown. Each removable power source compartment (230, 240) can also house one or more power module counterweights, not shown.

When in a closed position, the first removable power source compartment cover 235 seals first removable power source compartment 230 and release 237 is in a locked position to hold the cover closed. A user can actuate release 237 to unlock first removable power source compartment cover 245, which can be opened to allow access to power module removable power sources and power module counterweights. Similarly, when in a closed position, the second removable power source compartment cover 245 seals second removable power source compartment 240 and release 247 is in a locked position to hold the cover closed. A user can actuate release 247 to unlock the second removable power source compartment cover 245, which can be opened to allow access to power module removable power sources (not shown) and power module counterweights (not shown). In an exemplary embodiment, the power module 200 is rated for 1 m immersion in water.

Exemplary power module removable power sources include, but are not limited to, a primary or rechargeable energy storage device, for example a CR123, AA, or AAA cell. A particular exemplary power module energy storage device includes a rechargeable cell with an integrated battery controller. In alternative embodiments, a power module power source can include a fuel cell or other chemistry cell. It is anticipated that the power module 200 can include any suitable power source capable of being carried within one or more of the removable power source compartments (230, 240).

In a particular exemplary embodiment, the power module 200 holds up to six AA batteries, up to 3 batteries in each of first removable power source compartment 230 and second removable power source compartment 240. For example, power module 200 can include 2, 3, 4, or 6 AA batteries which can be electrically connected together in series, parallel, and combinations of series and parallel arrangements. The power level indicator 255 is configured to display an indication of an amount of power available from removable power source(s) included in the power module 200, for example a state of charge of batteries or an available power level of a fuel cell or other chemistry cell housed in the first and second removable power source compartments (230, 240).

Exemplary power module counterweights include cylindrical shaped weights formed with a shape that is similar to a power module battery and configured to fit into a power module removable power source compartment (230 or 240) in place of a power module battery. In an exemplary embodiment, power module counterweights are formed from a metallic material, for example, a steel material.

The base unit 110 is configured to provide internal electrical power to one or more accessory interfaces, for example to accessory interfaces that are attachable to a helmet. As shown, the base unit 110 provides electrical power to the strobe interface 300 over the strobe interface cable 305 and provides electrical power to the vision system interface 310 over the vision system interface cable 315. In some embodiments, the base unit 110 provides communication signals between the base unit and one or more of the accessory interfaces. For example, the base unit 110 can provide communication signals to the vision system interface 310 that include information to be shown on a display component of a vision system attached thereto. Additionally, the base unit 110 can receive communication signals, via accessory interfaces and interface cables, from one or more accessory devices operably connected to the accessory interfaces.

Each accessory interface (300, 310) is electrically connected to the base unit by a cable that may be removably or non-removably connected to the base unit 110. For example, the strobe interface 300 can be connected to and disconnected from the base unit 110 by attaching and detaching the strobe cable plug 307 to and from the strobe cable interface 130.

One or more accessory interfaces can be added or removed from the power system 100. Such a capability makes the power system 100 configurable and reconfigurable to include more or fewer accessory interfaces and multiple types of accessory interfaces as required for particular use cases.

In some embodiments, the base unit 110 provides communication signals to and from accessory interfaces (300, 310) over interface cables (305, 315). It can be appreciated that the base unit 110 also can provide electrical power and communication signals to more or fewer accessory interfaces than those shown in FIG. 1 without departing from the described technology.

The power module 200 is configured to be attached to and removed from the base unit 110 and includes a base unit interface 210. The base unit interface 210 includes an electro-mechanical interface that mechanically interfaces with an interface surface 117, a left interface protrusion 122, a left interface slot 126, a right interface protrusion 124, and a right interface slot 128. The left and right interface slots 126, 128 each form an open-ended recess in the interface surface 117, with an opening in the interface slot 126, 128 on a top surface of the base unit 110 that includes the power module electrical interface 115. The left and right interface protrusions 122, 124 each protrude from the interface surface 117, extend along the interface surface below the left and right interface slots 126, 128, and taper outward, increasing in width along an axial length of the base unit 110 between the top surface that includes the power module electrical interface 115 and the base unit battery case cover 195.

The base unit interface 210 electrically connects to the power module electrical interface 115. The power module 200 provides secondary electrical power to the base unit 110, which in turn provides the secondary electrical power to one or more accessory interfaces (e.g., 300, 310). In an exemplary embodiment, the power module electrical interface 115 includes a communication interface and the base unit 110 communicates with the power module 200 over the communication interface.

When the power module 200 is attached to the base unit 110, the release 205 interfaces with an interface ramp 119 disposed on the base unit 110 to lock the power module in place. A user can actuate the release 205 to disengage the release from the base unit 110, the result of which detaches the power module 200 from the base unit.

The external power source interface 133 can be attached to an external power source (not shown). In examples, the external power source might be a body-worn power manager or hub to which a power source is connected, a body-worn battery, or a vehicle power source.

The base unit 110 receives external power over external power cable 132 and provides the external power to one or more accessory interfaces (e.g., 300, 310). The base unit also can provide the external power to the power module 200. In some embodiments, the base unit 110 can exchange communication signals with a source of external power or with a hub or power manager. In some embodiments, the external power cable 132 can be detached from base unit 110 when not in use. In other embodiments, the power system 100 does not include an external power source interface 133 and corresponding external power cable 132.

Accessory interfaces 300 and 310 are formed as connection points for accessory devices and provide electrical power to accessory devices connected to the interfaces 300, 310. For example, as shown in FIG. 1, the strobe 520 is mechanically and electrically connected to the strobe interface 300. The strobe 520 is an accessory device that includes one or more of visual (e.g., LED) and infrared (IR) beacons. When the strobe 520 is connected to the strobe interface 300, the base unit 110 provides electrical power to the strobe interface 300 via the strobe cable 305. The strobe interface 300 then provides the electrical power to the strobe 520.

1.4.2 Example Helmet System Including an Example Power System

Figure 2:
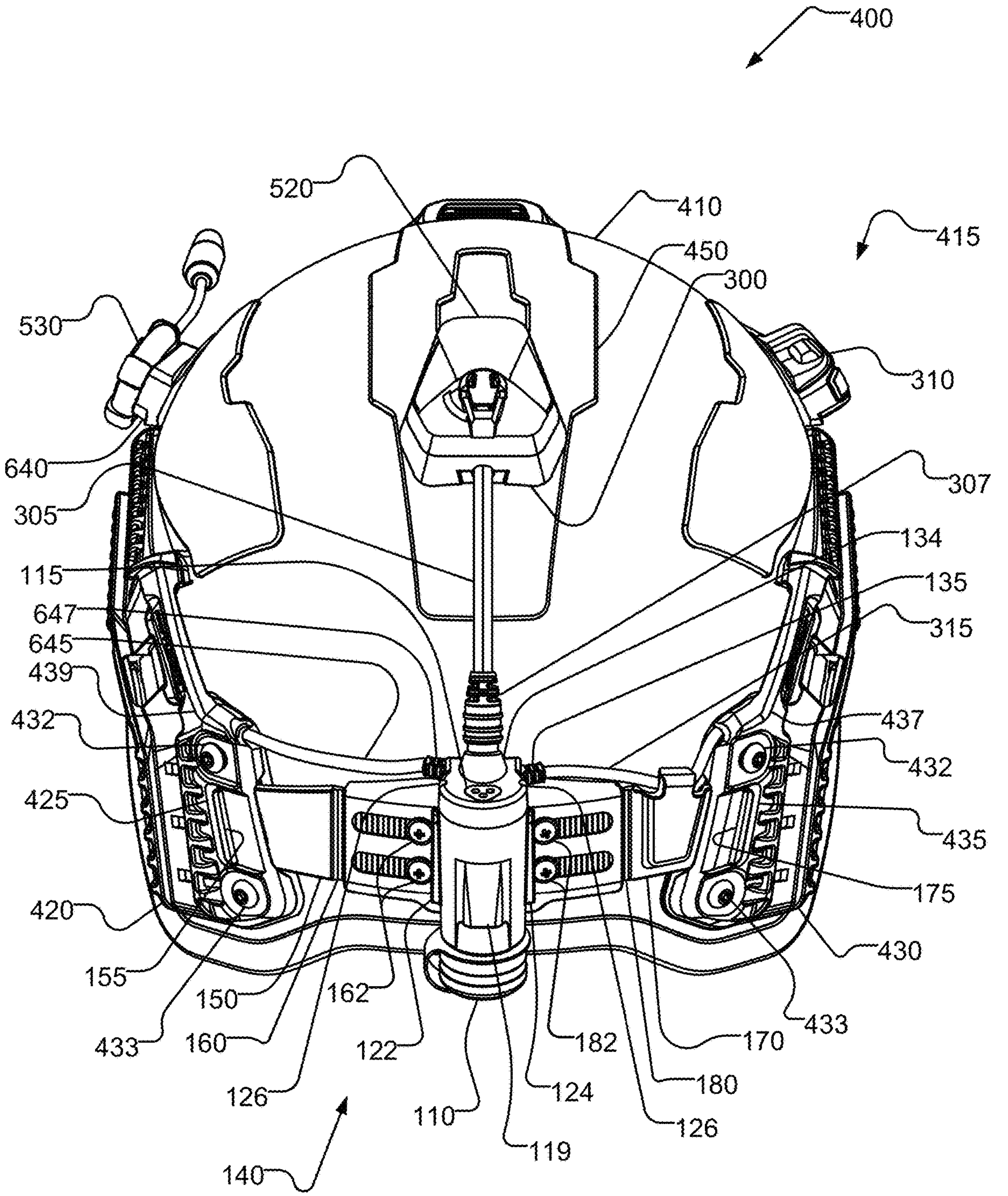
FIG. 2 is a rear perspective view of a helmet system that includes the power system in FIG. 1.

FIG. 2 shows a rear view of a helmet system 400. The helmet system 400 includes a power system 100 mounted on a helmet 410 and a strobe attachment pad 450 disposed on an upper rear surface of the helmet 410. The helmet system 400 further includes a rail system 415 mounted to the helmet 410. The power system 100 is substantially similar to that described in FIG. 1, with its external power cable 132 detached for clarity and with an additional accessory cable interface 647 attached to the base unit 110, an additional accessory interface cable 645 attached to the additional accessory cable interface 647, and an additional accessory interface 640 attached to the additional accessory interface cable 645. The base unit 110 is configured to provide power to, and in some embodiments communicate with, an accessory connected to the additional accessory interface 640.

The rail system 415 includes a left rail 420 and right rail 430, each of which are fixedly attached to the helmet 410. In one example, each of the rails 420, 430 are fixedly attached via one or more threaded fasteners (e.g., 432, 433). The right rail 430 includes a right attachment clip receptor 435 and a cable run 437. The left rail 420 includes a left attachment clip receptor 425 and a cable run 439 that is similar in configuration to the cable run 437.

In the illustrated example, the base unit 110 of the power system 100 is attached the helmet 410 via the adjustable attachment system 140. When the base unit 110 is attached to the helmet 410, it is also mounted on and carried by the helmet. The quick-attach system 140 is configured to allow the base unit 110 to be easily and quickly attached to and removed from the helmet 410. In alternative embodiments, not shown, the base unit 110 may be attached to the helmet 410 by one or more suitable means, for example an anchor with a fixing boss may be attached to the helmet with an adhesive or with screws or other mechanical fasteners and the base unit may be attached to the fixing boss of the anchor.

In more detail, the base unit 110 is attached to the helmet 410 by attaching the adjustable attachment system 140 to the rail system 415. The first attachment clip 150 is attached to the left rail 420 and the second attachment clip 170 is attached to the right rail 430. More specifically, the rail interface 155 of the first attachment clip 150 is interfaced with the attachment clip receptor 425 and the rail interface 175 of the second attachment clip 170 is interfaced with the attachment clip receptor 435.

Preferably, adjustable connectors 160, 180 are adjustable to allow a user to change a distance between each attachment clip 150, 170 and the base unit 110. Adjustment screws 162, 182 hold each adjustable connector 160, 170 in place and are releasable to allow a user to move each attachment clip closer to or further away from base unit 110. This allows base unit 110 to be attached to helmets of different sizes. When the attachment clips are spaced from each other at a distance apart that corresponds to a helmet of a particular size, first attachment clip 150 and second attachment clip 170 are each disposed at a distance from base unit 110.

In one embodiment, this distance is such that when the attachment clips 150, 170 are interfaced with rails 420, 430 of the helmet, adjustable connectors 160, 180 are placed under tension. In an example attachment operation, a user attaches a first attachment clip to a first rail, then pulls on a second attachment clip to displace it relative to the first attachment clip, thereby applying tension to adjustable connectors 160, 180. The user then attaches the second attachment clip to a second rail. In another embodiment, the user loosens the adjustment screws 162, 182, attaches each attachment clip to a rail, positions the base unit 110 in a desired position between the rails, and then tightens the adjustment screws.

In an alternative embodiment, the adjustable connectors 160, 180 are additionally or alternatively elastically deformable and are sized such that the first attachment clip 150 and the second attachment clip 170 are each disposed at a distance from the base unit 110. This distance is such that when the attachment clips 150, 170 are interfaced with the rails 420, 430, the adjustable connectors 160, 180 are elastically deformed under tension. In an exemplary embodiment, when the base unit 110 is detached from the helmet 410 (as shown in FIG. 1), a distance between the rail interface 155 and the rail interface 175 is less than a distance between the left attachment clip interface 425 and the right attachment clip interface 435. Here, the adjustable connectors 160, 180 are stretched to align each rail interface with a corresponding attachment clip interface. In one example attachment operation, a user attaches a first attachment clip to a first rail, then pulls on the other attachment clip to displace the other clip relative to the first attachment clip. As a result, the adjustable connectors 160, 180 stretch. The user then attaches the other attachment clip to the second rail.

Attaching base unit 110 to rail system 415 using adjustable connectors 160, 180 provides a number of advantages. The base unit 110 can be attached to and removed from helmet 410 without the use of tools. The adjustable connectors 160, 180 can also be adjusted to provide variable lengths between the base unit and each adjustment clip. This allows the base unit 110 to be attached to multiple helmets, each having a different size and/or different distance between rails 420, 430 and corresponding attachment clip receptors 425, 435. Advantageously, this one-size-fits-all aspect of power system 100 provides simplified logistics and reduced whole life costs. Because the adjustable connectors 160, 180 are under tension when the base unit 110 is attached to helmet 410, the adjustable connectors draw the base unit 110 tightly against the helmet 410 and can hold the base unit in place without the need for additional fastening means.

Accessory interfaces of the power system 100 are removably attachable to the helmet system 400 independently of base unit 110. As shown, the strobe interface 300 and the vision system interface 310 accessory interfaces, and additional accessory interface 640 are attached to the helmet system 400.

The accessory interfaces include electrical interfaces and mechanical connectors. Some accessory interfaces, for example the strobe interface 300 and additional accessory interface 640, include connectors for attaching an accessory device. Other accessory interfaces, for example the vision system interface 310, include connectors for attaching a cable or other connector component of an accessory, while the accessory device itself is separately mechanically attached to the helmet system 400. Accessory interfaces can include connectors including, for example, an accessory's third party connector, a custom connector, or a mechanical connector that can be attached to a helmet rail. A power system 100 according to the technology disclosed herein can include one, two, or more accessory interfaces.

The strobe interface 300 can be removably attached to the strobe attachment pad 450, which in turn is fixedly attached to the helmet 410. In an exemplary embodiment, the strobe attachment pad 450 and the strobe interface 300 are removably attachable to each other using a hook and loop fastener system. In an exemplary use case, a user attaches the base unit 110 to the helmet 410 using the adjustable attachment system 140. The user then attaches the strobe interface 300 to the helmet 410 using the strobe attachment pad 450, and connects the strobe interface cable 305 to the base unit 110. The user can subsequently detach the strobe interface cable 305, remove the strobe interface 300 from the helmet 410, and optionally replace the strobe interface 300 and strobe interface cable 305 with a same or different interface and cable.

The strobe 520 can be detached from the strobe interface 300, for example, to stow the strobe 520 when not in use or to replace a first strobe with a second strobe or with another device that is compatible for attachment to the strobe interface. The user can attach or remove the strobe 520 to/from the strobe interface 300 while the strobe interface remains attached to the helmet 410. Additionally or alternatively, the strobe 520 can be attached and removed from strobe interface 300 when the strobe interface is detached from the helmet 410. In some embodiments, a strobe is non-removably attached to the strobe interface 300.

In an exemplary embodiment, the strobe 520 includes one or more of a visible light illumination system, for example a LED system, and an infrared illumination system. The strobe 520 can provide beacon or identification signals by presenting different colors of visible light at different times, or by presenting steady or intermittent pulses of visible or infrared light with one or more patterns and levels of brightness, in examples.

As shown, the strobe interface 300 is located on an upper rear surface of the helmet 410. In some exemplary embodiments, the strobe interface 300 is configured to allow multiple different types of accessory devices to be attached to the strobe interface, in place of or in addition to strobe 520. In examples, a user can attach accessories including a strobe 520, a laser threat warning system, or an acoustic gunshot detection system to the strobe interface 300. In an embodiment, the strobe interface 300 accepts one powered accessory at a time. For example, a user can remove the strobe 520 from the strobe interface 300, or replace the strobe 520 with a laser threat warning system.

The vision system interface 310 is removably attached to the right rail 430 or to an anchor with a fixing boss that is mounted on the helmet 410. In one example, the vision system interface 310 is attached to a front anchor component of a known rail system and is electrically connected to the base unit 110 via the vision system interface cable 315.

The additional accessory interface 640 is removably attached to the left rail 420. In one example, the additional accessory interface 640 is attached to a front anchor component of a known rail system and is electrically connected to the base unit 110 via the additional accessory interface cable 645. As shown, a task light 530 is removably attached to the additional accessory interface 640. One or more additional or alternative accessories can also be attached to the additional accessory interface.

Although not shown, the power system 100 can include still further additional accessory interfaces for providing power to additional accessories attached to the helmet 410. These additional accessories might include a helmet-mounted communication headset, hearing protection, or combination communications and hearing protection head set, a heads up display, a laser warning system, a gunshot detection system, an inspection light, a head illuminator, and an inertial measurement unit (IMU). In one embodiment, the power system 100 includes two or more strobe interfaces 300, each of which can accept a different accessory device.

Advantageously, the power system 100 can be reconfigured by adding one or more accessory interfaces, removing one or more accessory interfaces, and replacing one or more cables, all while the base unit 110 is still attached to the helmet 410. The power system 100 can similarly be reconfigured when it is detached from helmet 410. Further, the power system 100 can be removed from a first helmet and installed on a second helmet. Advantageously, the power system 100 can be attached to a helmet that is not otherwise configured with power or data connections; for example, with built-in power and device ports or with built in power management functionality. In this manner, the power system 100 enables data and power on an otherwise non-powered helmet by providing the removably attachable base unit, multiple accessory interfaces, and interface cables to connect the interfaces to the base unit, all of which can be added to an existing helmet regardless of the power and data capabilities built into the helmet or into rail or other attachment systems comprising the helmet.

The helmet system 400 has multiple facilities for holding and organizing cables attached thereto. In one example, the base unit attachment clips 150, 170 include features for holding and organizing accessory interface cables. In another example, the vision system interface cable 315 is interfaced with and held in place by the cable clip 177 to help prevent snags. In yet another example, a loop of interface cable 315 can be disposed in a cable pocket 179 if the user desires to shorten a length of the cable disposed between cable clip 177 and the vision system interface 310. In still another example, the vision system interface cable 315 is interfaced with and held in place by the cable clip 177 and routed through a cable run 437. In some embodiments, the cables and most of the base unit 110 can be covered by a softgoods helmet cover (not shown).

1.4.3 Example Helmet System with Attached Vision System

Figure 3:
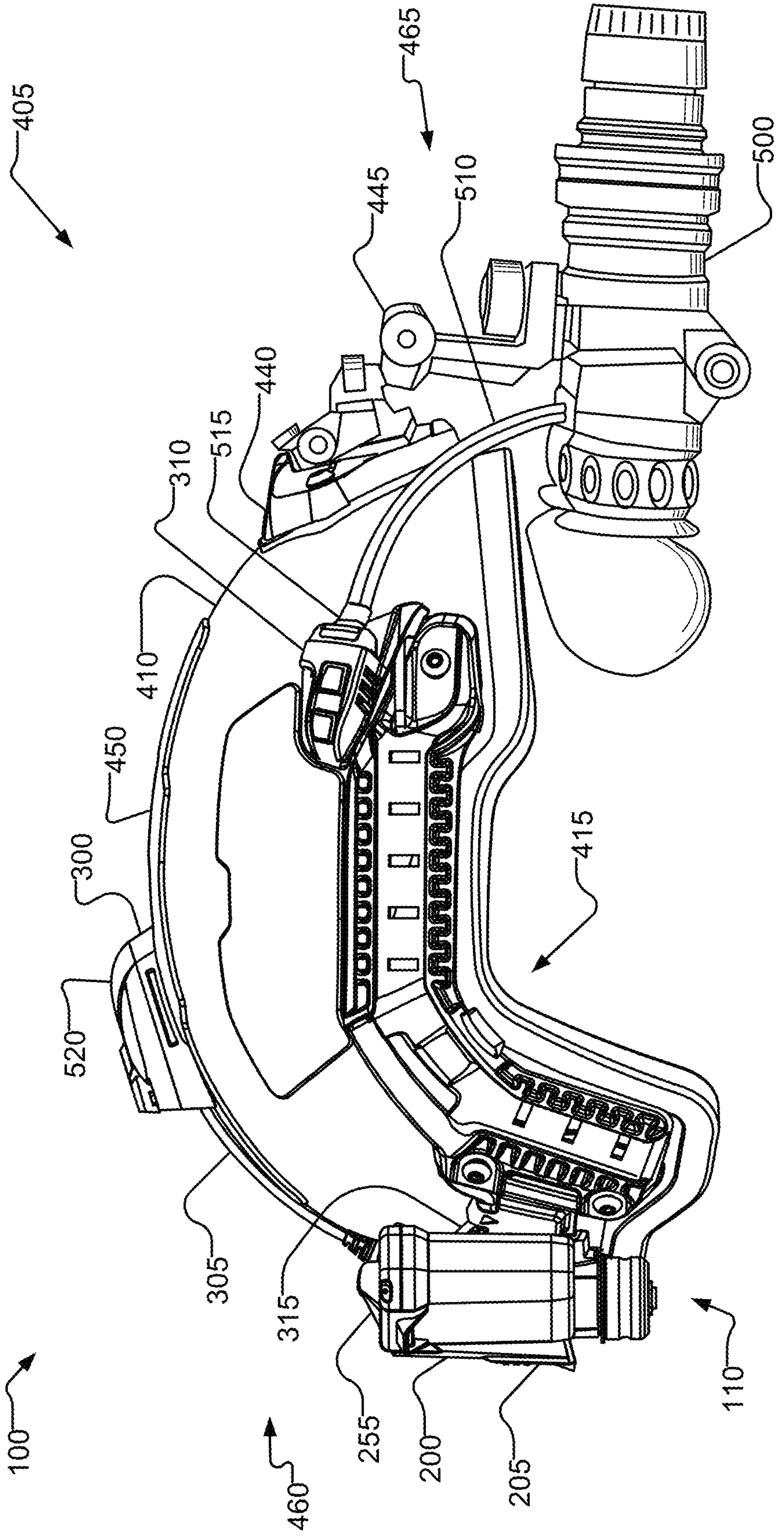
FIG. 3 is a side view of the helmet system in FIG. 2 with a vision system attached thereto.

FIG. 3 shows another exemplary helmet system 405 with a power system 100. The power system 100 in attached to the helmet 410. The power system 100 includes a base unit 110, a strobe accessory interface 300, and a vision system accessory interface 310. A strobe 520 is attached to the strobe accessory interface 300. Power module 200 is attached to and mounted on base unit 110. In the illustrated example, the base unit 110 and the power module 200 are disposed on a rear side 460 of the helmet 410.

The helmet system 405 also includes a vision system 500 disposed near a front side 465 of the helmet 410. The helmet 410 includes a front accessory connection plate 440 disposed on the second side 465 of the helmet. The vision system 500 is connected to a front accessory mounting system 445 which, in turn, is connected to the front accessory connection plate 440. The vision system 500 includes a vision system cable 510, which is terminated with a vision system interface plug 515. The vision system interface plug 515 is connected to the vision system accessory interface 310.

Vision system 500 is removably attachable to helmet 410. In the illustrated embodiment, the vision system 500 is attached to a known front accessory mounting system 445. The front accessory mounting system is, in turn, attached 445 to a known front accessory connection plate 410. An exemplary vision system 500 includes one or more of night vision goggles (NVG), for example, a binocular night vision device, and an enhanced clip-on thermal imager (E-COTI). When the power module 200 is attached to the base unit 110 on the first side 460 of the helmet 410, the weight of the power module at least partially balances the weight of the vision system 500 disposed on second side 465 of the helmet. In examples, a user can add one or more counter-weights to the power module 200 to increase the extent to which the power module balances the weight of the vision system 500.

The vision system interface plug 515 is removably mechanically and electrically interfaced with the vision system interface 310. As shown, the vision system interface plug 515 includes a male portion of a side squeeze quick release buckle connector, and the vision system interface 310 includes a female portion of the side squeeze quick release buckle connector. However, other types of connector systems can be used without departing from the technology disclosed herein. In examples, the vision system interface plug 515 and the vision system interface 310 together comprise one or more of: a different configuration of a squeeze-lock connector; a bayonet-style connector; and a twist lock connector.

The base unit 110 provides electrical power to the vision system interface 310 via the vision system interface cable 315. The vision system interface 310 then provides the electrical power to the vision system 500 via the vision system cable 510. In some embodiments, the vision system plug 515 and the vision system interface 310 each include communication interfaces, and the base unit 110 can send and receive communication signals to and from the vision system 500.

In a first operating mode, the base unit 110 provides internal power to strobe 520 via strobe interface 300 and to vision system 500 via vision system interface 310. In an exemplary embodiment, the base unit 110 can provide internal power sufficient for approximately eight hours of run time for the strobe 520 and vision system 500, where the vision system is a NVG system, in one example. In a second operating mode, the power module 200 provides secondary power to the base unit 110, which provides the secondary power to the strobe 520 and to the vision system 500. In an exemplary embodiment, the power module 200 can provide secondary power sufficient for approximately 14 to 16 hours of run time for the strobe 520 and vision system 500, where the vision system is an NVG system with an enhanced clip-on thermal interface ("E-COTI") attached.

In an exemplary use case, a soldier wears a helmet system 400 or 405 that includes one or more accessories, e.g., a strobe 520, during daytime, maritime, or littoral operations. The soldier typically operates the power system 100 without the power module 200 during these operations. The base unit 110 provides internal power to the one or more accessories. In one example, extra power is not needed to power a night vision system. In other examples, the soldier does not desire added weight of a power module and instead relies on power from the base unit 110 for reduced weight and for increased environmental durability, e.g. for a greater immersion rating as compared to that of a power module.

During nighttime and/or land operations, the soldier may add the power module 200 to the power system 100. The power module 200 provides added secondary power to the base unit 110. The soldier may also add a vision system 500 such as an NVG system and may attach an E-COTI to the NVG system. The power module 200 counterbalances the weight of the night vision system 500. The base unit 110 provides the secondary power to the strobe 520 and to the vision system 500. In this manner, the soldier can add power module 200 only when needed, thereby reducing the weight of the helmet system 400 when the power module 200 is not needed.

In a further exemplary use case, the soldier can operate the power system 100 without the power module 200 during nighttime operations. Here, the soldier might operate the power system for short periods of time during intense maneuvers or tactical operations when the extra weight of power module 200 is not desirable. Under these conditions, the base unit 110 provides internal power to the strobe 520 and vision system 500.

1.4.4 Example Power Module of an Example Power System

Figure 4A:
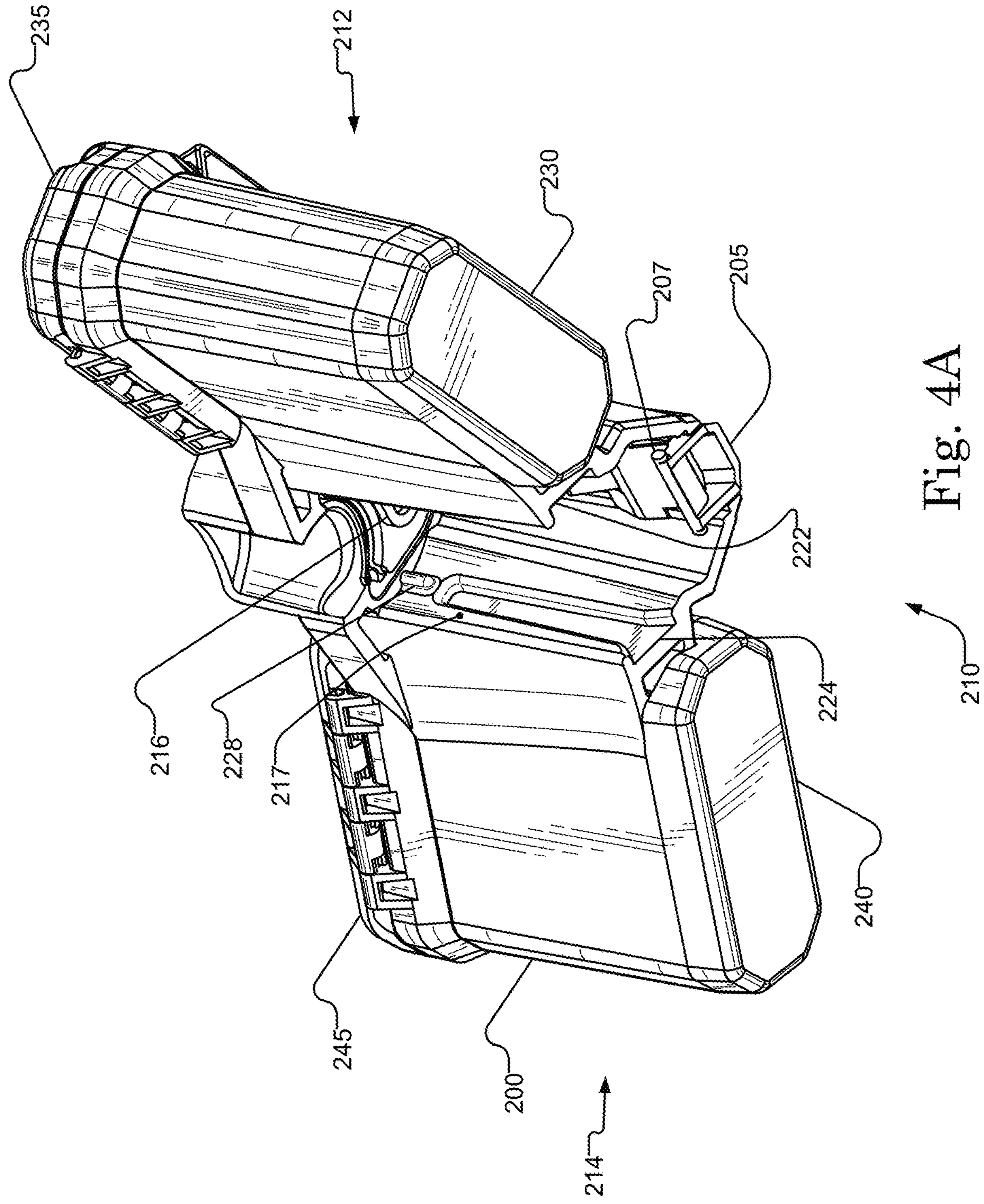
FIG. 4A is a rear perspective view of a power module of the power system in FIG. 1.
Figure 4B:
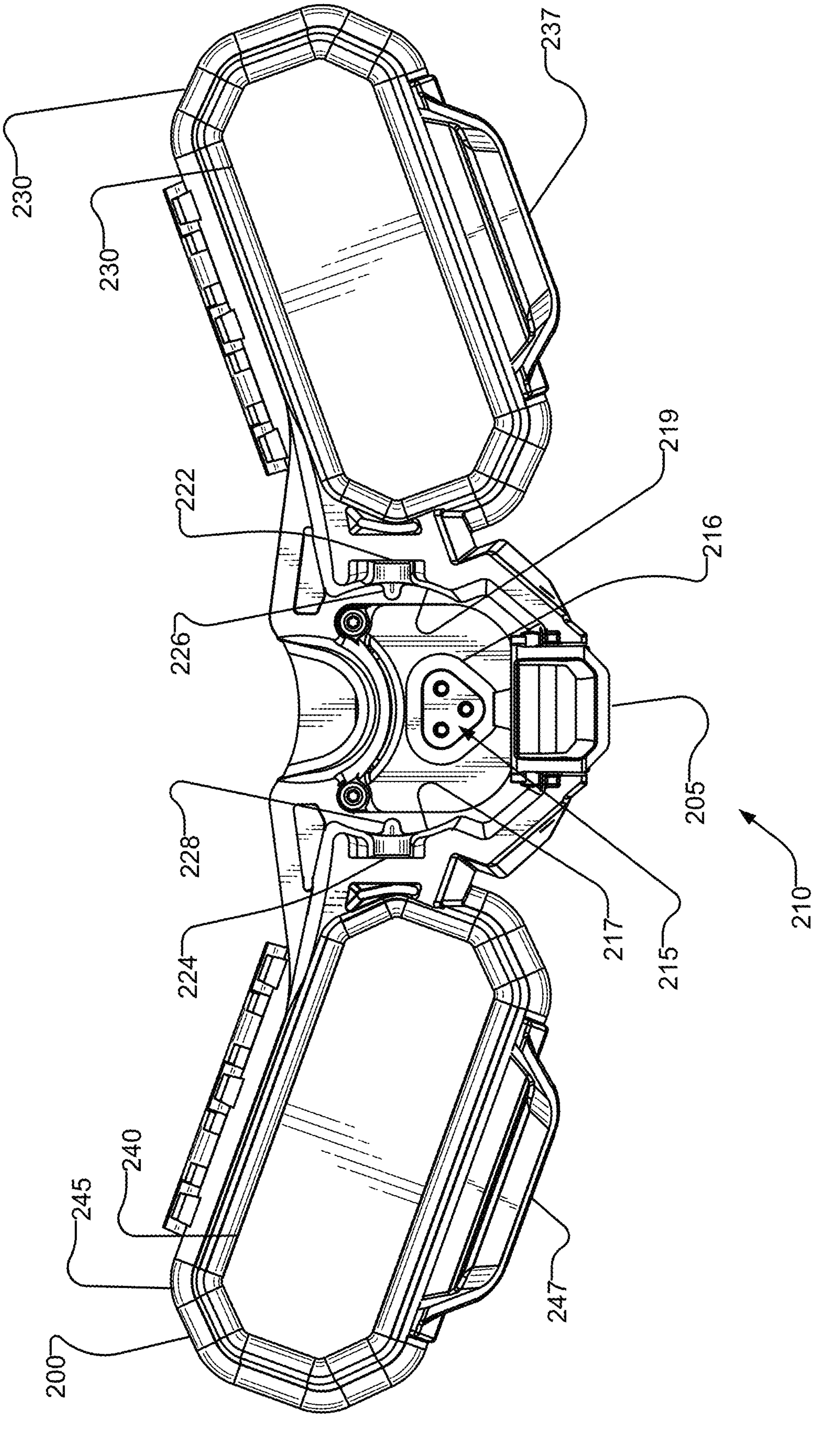
FIG. 4B is a bottom view of the power module in FIG. 4A.

FIG. 4A shows a rear perspective view of a power module 200. FIG. 4B shows a bottom view of the power module 200. The power module 200 has a left side 212 and a right side 214, corresponding to left side 112 and right side 114 of the base unit 100, as shown in FIG. 1. The power module includes the first (left) removable power source compartment 230, the first removable power source compartment cover 235, the release 237, the second (right) removable power source compartment 240, the second removable power source compartment cover 245, the release 247, the power module release 205, and the base unit interface 210.

The power module release 205 includes a release catch bar 207.

The base unit interface 210 includes a base unit electrical interface 215 and an electrical interface gasket 216. The electrical interface gasket surrounds the base unit electrical interface 215.

The base unit interface 210 includes a right side interface surface 217, a right protrusion groove 224, and a right slot protrusion 228. The right protrusion groove 224 is formed as an open-ended recess in the right side interface surface 217. The right slot protrusion 228 extends radially outward from the right side interface surface. The base unit interface 210 includes a left side interface surface 219, a left protrusion groove 222, and a left slot protrusion 226. The left protrusion groove 222 is formed as an open-ended recess in the left side interface surface 219. The left slot protrusion 226 extends radially outward from the left side interface surface 219.

Referring now to FIGS. 1, 2, 3, 4A, and 4B, a user can attach and remove a power module 200 while the base unit 110 remains in place on the helmet 410. In exemplary embodiment, the user can attach and remove the power module 200 to and from the base unit 110 using one hand. When the user attaches the power module 200 to the base unit 110, the release catch bar 207 interlocks with the interface ramp 119 to hold the power module in place on the base unit. In some embodiments, the power module release 205 includes a spring or other elastically deformable member (not shown) that holds the release catch bar 207 in an interlocked position when the power module 200 is assembled onto the base unit 110. The user can actuate the power module release 205 to unlock the release catch bar 207 from the interface ramp 119, which allows the power module 200 to be removed from the base unit.

The power module 200 and base unit 110 each include features that mate with corresponding features on the other component to align and position the power module 200 relative to the base unit.

Left side interface surface 217 and right side interface surface 219 are each formed to correspond with and to mate with the interface surface 117. As shown, the interface surface 117 is formed as a convex curved cylinder and the left and right interface surfaces 217 and 219 are each formed as a concave curved surface that is configured to slidingly mate with the interface surface 117. In alternative embodiments, interface surface 117 may be formed with a different shape as compared to the illustrated cylindrical shape; for example an oval or polyhedron cross section cylinder shape. In these alternative embodiments, the left and right interface surfaces 217 and 219 are each shaped to mate with the interface surface 117.

The right interface protrusion 124 of the base unit 110 is configured to slide into the right protrusion groove 224 of the power module 200 and the left interface protrusion 122 is configured to slide into the left protrusion groove 222 of the power module 200. The right and left protrusion grooves 224 and 222 provide guides and stops for positioning the power module 200 relative to the base unit 110. The left slot protrusion 226 is configured to slide into and mate with the left interface slot 126 and the right slot protrusion 228 is configured to slide into and mate with the right interface slot 128. The left and right interface slots 126 and 128 provide guides and stops for positioning the power module 200 relative to the base unit 110. The guides and stops provided by the slots 126, 128 and grooves 222, 224 are configured to aid in positioning the power module release 205, and more particularly the release catch bar 207, relative to the interface ramp 119 to lock power module 200 in place on the base unit 110 when the two components are assembled together. In some embodiments (not shown) the left slot protrusion 226, left interface slot 126, right slot protrusion 228, and right interface slot 128 are omitted and the right interface protrusion 124, right protrusion groove 224, left interface protrusion 122, and left protrusion groove 222 function alone to align the power module 200 on base unit 110 and to position the release catch bar 207 relative to the interface ramp 119.

When the power module 200 is attached to the base unit 110, the power module electrical interface 215 interfaces with the base unit electrical interface 115, providing electrical contact there between sufficient for the exchange of electrical power and communication signals. In an example embodiment, electrical interface 115 includes contact pads and electrical interface 215 includes pogo pin connectors that mate with the contact pads when the power module 200 is attached to the base unit 110.

The electrical interface gasket 216 is formed from a compressible material, for example from a solid polymer or from a closed cell foam material. The electrical interface gasket 216 is placed into a partially compressed configuration between the base unit 110 and the power module 200 when the power module is attached to the base unit. While in this partially compressed configuration, the electrical interface gasket 216 forms a water and air tight seal around the base unit electrical interface 215 and power module electrical interface 115.

1.4.5 Example Power System Schematic Diagram

Figure 5:
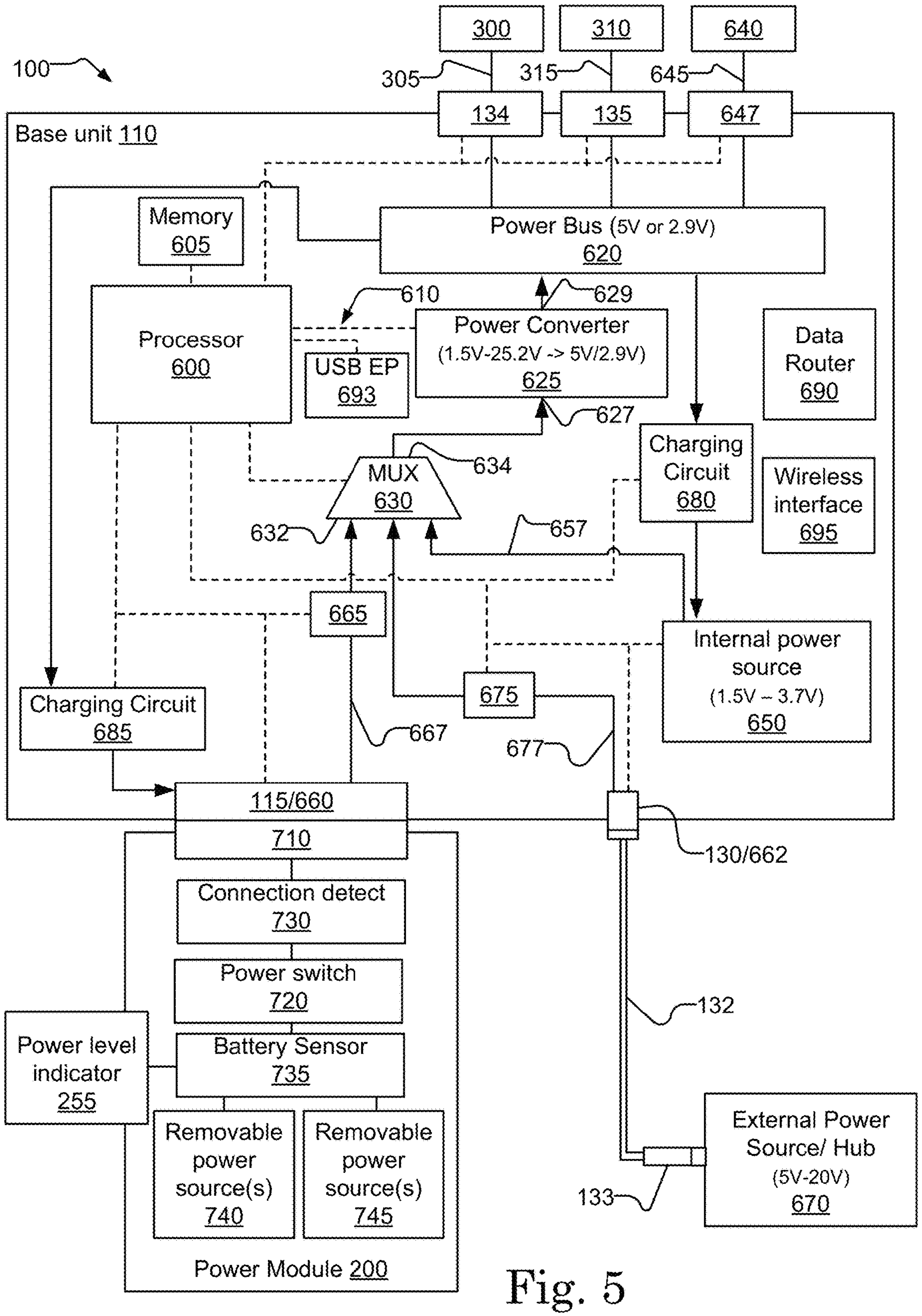
FIG. 5 is a schematic diagram illustrating aspects of the power system in FIG. 1.

FIG. 5 shows a schematic diagram including a power system 100 and an external power source 670. The power system 100 includes a base unit 110, a power module 200, a strobe accessory interface 300, a vision system interface 310, an additional accessory interface 640, and an external power source interface 133. The power system 100 is typically mounted on a helmet. For example, referring now to FIGS. 2 and 3, the base unit 110 is typically mounted on a helmet 410 and the power module 200 may be mounted on the base unit. Referring once again to FIG. 5, the external power source 670 can include a power source connected to a body-worn hub or power manager. In examples, the external power source is not mounted on the power system base unit 110 or a helmet 410 upon which the base unit is mounted.

The base unit 110 includes a direct current ("DC") power bus 620. The base unit 110 includes a strobe accessory cable interface 134, a vision system accessory cable interface 135, and an additional accessory cable interface 647. Each accessory cable interface 134, 135, and 647 is electrically connected to the power bus 620. The base unit 110 includes the external power cable interface 130 and the power module interface 115.

The base unit 110 includes a power converter 625, an internal power source 650 and a power multiplexer (MUX) 630. The power converter 625 includes an input port 627 and an output port 629. The MUX 630 has an input side 632 and an output side 634. The output port 629 of the power converter 625 is electrically connected to the power bus 620. The input port 627 of the power converter 625 is electrically connected to the output side 634 of the MUX 625.

The base unit also includes multiple power channels, each represented by a solid line. These channels include an internal power channel 657, a secondary power channel 667, and an external power channel 677.

The internal power source 650 is electrically connected to an input side 632 of the MUX 630 via the internal power channel 657. The extended power interface 660 is electrically connected to the removable power interface 115 and the secondary power channel 667. The extended power interface 660 is electrically connected to the input side 632 of the MUX 630 via secondary power channel 667. The external power interface 662 is electrically connected to the external power cable interface 130 and to the external power channel 677. The external power interface 662 is electrically connected to the input side 632 of the MUX 630 via the external power channel 677.

A secondary power sensor 665 is disposed along the secondary power channel 667, between the extended power interface 660 and the MUX 630. An external power sensor 675 is disposed along the external power channel 677, between the external power interface 662 and the MUX 630.

The base unit 110 also includes charging circuits 680, 685 for charging rechargeable internal and removable power sources. An internal charging circuit 680 is electrically connected to the power bus 620 and to the internal power source 650 and is disposed therebetween. A secondary charging circuit 685 is electrically connected to the power bus 620 and to the extended power interface 660 and is disposed therebetween.

The base unit 110 also includes a processor 600 and associated memory 605 and a communication network 610, indicated by dashed lines. The processor 600 is communicatively coupled, via communication network 610, to the power converter 625, MUX 630, internal power source 650, secondary power sensor 665, external power sensor 675, internal charging circuit 680, and the secondary charging circuit 685. In some additional embodiments, the processor 600 is communicatively connected to the extended power interface 660 and to the external power cable interface 130. In example embodiments, the processor 600 can include a microprocessor or a field programmable gate array (FPGA), each of which may operate one or more software operations. In a particular embodiment, the processor 600 operates an Android operating system (OS) and one or more Android OS applications, for example an Android Tactical Assault Kit (ATAK) application.

The base unit 110 additionally includes a data router 690 and a wireless interface 695. In some embodiments, the data router 690 is communicatively connected to the wireless interface 965, processor 600, power module interface 115, and the external power cable interface 130.

The strobe accessory interface 300 is electrically connected to the strobe accessory cable 305. The strobe accessory cable 305 is electrically connected to the strobe accessory cable interface 134. The vision system accessory interface 310 is electrically connected to the vision system accessory cable 315.

The vision system accessory cable 315 is electrically connected to the vision system accessory cable interface 135. Additional accessory interface 640 is electrically connected to an additional interface cable 645. Additional accessory interface cable 645 is electrically connected to an additional accessory cable interface 647. Additional accessory interface 647 can include one or more accessory interface in addition to strobe interface 300 and vision interface 310. Additional accessory interface 647 includes, in examples, one or more of an audio system or hearing protection system interface, inspection system interface, or illumination system interface.

The external power source 670 is electrically connected to the external power source interface 133, which in turn is electrically connected to the external power cable 132. The external power cable 132 is electrically connected to the external power cable interface 130.

The external power source 670 includes a source of external power, for example a vehicle power source such as an aviation power supply, ground vehicle power supply, or a maritime platform power supply. In some embodiments, the external power source interface 133 is connectable to a body-worn power management system or to a body-worn power and data hub. The power management system can manage power from various connected sources such as a renewable energy source, grid power, fuel cell, or battery. Exemplary operating voltages of the external power source 670 include 5V through 20V, for example 5V universal serial bus ("USB") and/or 10V-20V raw DC power.

The power module 200 includes one or more removable power sources 740, 745, an electrical interface 710, a power switch 720, a connection detector 730, a battery sensor 735, and the power level indicator 255. The electrical interface 710 is electrically connected to the power module electrical interface 115 and to the extended power interface 660.

The connection detector 730 senses when the electrical interface 710 is connected to the power module electrical interface 115, and in response, the power switch 720 connects one or both of the removable power sources 740 and the 745 to the electrical interface. In an exemplary embodiment, the removable power sources 740, 745 each include one or more energy storage devices comprising one or more cells. In some embodiments, the removable power sources 740, 745 include rechargeable energy storage devices. In some additional or alternative embodiments, the removable power sources 740, 750 include one or more of a fuel cell or any suitable power source that can be housed in the power module 200. In some further exemplary embodiments, the power module 200 includes a charging circuit (not shown). Exemplary operating voltages of removable power sources 740, 745 include 3V through 25.4V, depending on number, type, and arrangement of energy storage devices comprising the removable power sources. The battery sensor 735 determines a remaining power level value of the removable power sources, for example a value of a state of charge (SoC) of a battery cell or a remaining fuel value of a fuel cell, using a known method, for example, by determining a magnitude of voltage of a power signal generated by a removable power source or by communicating with a removable power source that includes internal power monitoring. The battery sensor generates control signals based on the determined power level value and communicates the control signals to the power indicator 255 which in turn displays and indication of a remaining power level, for example, by illuminating one or more LEDs with the number of illuminated LEDs corresponding to the remaining power level. In some embodiments, the battery sensor 735 communicates the remaining power level to the processor 600.

The internal power source 650 includes an energy storage device. In some embodiments, the internal energy source 650 includes a rechargeable energy storage device. In examples, the internal energy source 650 includes one or more of a primary cell, a rechargeable cell, and a supercapacitor. In further exemplary embodiments, the internal power source includes a charging circuit or charge controller (not shown). The internal power source 650 typically operates at a voltage of 1.5V through 3.7V, depending on type and configuration of energy storage devices comprising the internal power source.

Multiple power channels (657, 667, and 677) are each electrically connected to the input side 632 of the MUX 630. The MUX 630 selectively connects a single one of the power channels to the output side 634 of the MUX 630. The output side 634 of the MUX 630 is electrically connected to the input power port 627 of the power converter 625. In this manner, the MUX effectively electrically connects a single one of the internal power source 650, power module 200, and the external power source 670 to the input power port 627 of the power converter 625.

In an alternative embodiment (not shown), the MUX 630 is replaced by a different switching mechanism. For example, the mechanism can include multiple individual switches, each disposed along one of the power channels 657, 667, 677, and each independently operable to open and close to connect or disconnect a single one of the internal power source 650, power module 200, and external power source 670 to the input power port 627 of the power converter 625.

The power converter 625 receives an input power signal from an electrically connected power source at the input power port 627. The power converter 625 then generates, based on the input power signal, an output power signal at the output power port 629. The power converter 625 converts a voltage of an input power signal to a voltage of an output power signal that is matched to a power bus voltage. In some embodiments, the power converter 625 modulates a current flow of the output power signal.

The power bus 620 receives a power converter output power signal having a bus voltage (e.g., 5V or 2.9V) from the output power port 629 of the power converter 625. The power bus 620 distributes the power signal, at the bus voltage, to one or more accessory devices, each electrically connected to the power bus. Cable accessory interfaces 134, 135, 647 each receive a bus voltage power signal from the power bus 620 and provide the bus voltage power signal to the accessory interfaces 134, 135, 647 over accessory interface cables 305, 315, and 645, respectively. The accessory interfaces provide the bus voltage power signals to accessory devices connected to the interfaces, for example to the strobe 520, vision system 500, and to one or more additional accessories connected to the additional accessory interface 647. In examples, additional accessories powered by one or more accessory interfaces 647 include one or more of a communication headset, hearing protection headset, one or more additional strobes, laser threat warning systems, acoustic gunshot detection systems, inertial measurement units, heads up displays, inspection light, and head illuminator.

In some embodiments, the communication network 610 extends to one or more of the cable accessory interfaces and the base unit 110 exchanges communication signals with and between the accessory devices.

The power bus 620 distributes the power signal, at the bus voltage, to the internal charging circuit 680 and to the secondary charging circuit 685. The internal charging circuit 680 receives a bus power signal at a power bus voltage and converts a voltage of the bus power signal to an internal charging power signal voltage that is compatible with internal power source 650. The internal charging circuit modulates a current flow of the internal charging power signal and provides the internal charging power signal to the internal power source 650 to charge one or more energy storage devices thereof. In an exemplary embodiment (not shown), the internal power source 650 includes an internal charging circuit and the base unit 110 provides a bus power signal from the power bus 620 to the internal power source 650 without use of the charging circuit 680.

The secondary charging circuit 685 receives a bus power signal at a power bus voltage and converts a voltage of the bus power signal to a secondary charging power signal voltage that is compatible with removable power sources 740, 745. The secondary charging circuit modulates a current flow of the secondary charging power signal and provides the secondary charging power signal to the removable power sources 740, 745 to charge one or more energy storage devices thereof. In an exemplary embodiment (not shown), the power module 200 includes one or more removable power source charging circuits and the base unit 110 provides a bus power signal from the power bus 620 to the power module 200 without use of the secondary charging circuit 685.

The memory 605 includes instructions that, when executed by the processor 600, cause the processor to perform functions as described herein. The processor receives communication signals from various components of the power system 100 including, for example, the secondary power sensor 665, external power sensor 675, internal power source 650, and in some embodiments the power module electrical interface 115 and/or the external power source cable interface 130. Example communication signals received by the processor include measurements, for example measurements of voltage or power, generated by the power sensors or state of charge (SoC) data generated by one or more of the internal power source 650, power module 200, and the external power source 670.

The processor 600 generates communication signals and provides them to components of power system 100 including, for example, the MUX 630, power converter 625, and the charging circuits 680 and 685. Example communication signals generated by the processor include instructions for one or more components of the power system 100, for example, output voltage settings, current modulation settings, and switching settings for one or more of the power converter 620, MUX 630, and the charging circuits 680, 685.

In some embodiments, the power sensors 665, 675 measure power characteristics (e.g., one or more of voltage and current magnitude) of a power signal passing through a power channel along which they are disposed and generate communication signals that include voltage and/or current magnitude measurement values. In other embodiments, the power sensors 665, 675 operate as connection detection devices and communicate signals that include an indication that a connection of an external device has been detected, for example, based upon a change in voltage of a power signal on a power channel. In some embodiments, one or more of the internal power source 650, power module 200, and the external power source generate communication signals and communicate them to the processor 600. Communication signals generated by internal power source 650, power module 200, and external power source 670 include, for example, information regarding one or more energy storage devices or other power stores associated with each power source. For example, the internal power source 650 or power module 200 can generate communication signals that include SoC, remaining power, estimate remaining run time, or the like corresponding to one or more energy storage devices of a constituent power source.

The processor 600 receives communication signals from the removable power sensor 665 and the external power sensor 675. The processor 600 receives communication signals from the internal power source 650 or from a sensing device associated therewith. In some embodiments, the processor 600 receives communication signals from one or more of the power module 200 and the external power source 670. The processor 600 determines, based on information such as voltage, current, and/or SoC measurement values contained in the communication signals, whether each of the power sources is available to provide power. The processor 600 then selects a power source from among the available power sources to energize the power bus.

The processor 600 also sends communication signals to the MUX 630 and the power converter 625. The communication signals include instructions, that when implemented by the MUX and power converter, cause the selected power source to be electrically connected to the power bus 620 and a voltage of a power signal provided by the selected power source to be converted to a bus voltage. In one example, the power converter 625, under control of the processor 600, configures power converting settings to convert a voltage of a power signal received at input power port 627 to a bus voltage at output power port 629. The MUX 630, under control of the processor 600, electrically connects the selected power source, and only the selected power source, to the input power port 627 of the power converter 625.

In some embodiments, instructions stored on the memory 605 include one or more pre-configured power bus voltage settings. In an exemplary operating mode, processor 600 selects one of the pre-configured power bus voltage settings and communicates instructions to the power converter 625 that include the selected power bus voltage settings. In response, the power converter converts a voltage of a power signal received at input power port 627 to a voltage matched to the selected pre-configured bus voltage setting. The processor 600 subsequently selects a different one of the one or more pre-configured power bus voltage settings and communicates additional instructions to the power converter 625. In response, the power converter converts the voltage of the power signal to a voltage matched to the one or more pre-configured power bus voltage settings.

The processor 600 also determines whether one or more energy storage devices can and should be charged and, if so, selects one or more energy storage devices for charging. The energy storage devices can include the internal power source 650 and the power module 200.

When the processor 600 selects internal power source 650 for recharging, the processor sends communication signals to the internal charging circuit 680 that include charging configuration settings. In response, the internal charging circuit 680 configures conversion of a voltage of a bus power signal to an internal charging power signal voltage and configures modulation of a charging current to provide an internal charging power signal to internal power source 650. When the processor 600 selects one or more removable power sources 740 and/or 745 for recharging, the processor sends communication signals to the secondary charging circuit 685 that include charging configuration settings. In response, the secondary charging circuit 685 configures conversion of a voltage of a bus power signal to a secondary charging power signal voltage and configures modulation of a charging current to provide a secondary charging power signal to the power module 200.

In an exemplary operating mode, when a removable power source 740 or 745 is electrically connected to the power bus 620 and provides secondary power to the power bus, the processor 600 selects the internal power source 650 for charging. In another exemplary operating mode, when an external power source 670 is electrically connected to the power bus 620 and provides external power to the power bus, the processor selects one or more of the internal power source 650, removable power source 740, and the removable power source 745 for recharging. In a further exemplary operating mode, processor 600 preferentially selects the internal power source 650 for recharging when an external power source 670 provides external power to the power bus 620. In a still further exemplary embodiment, removable power sources 740, 745 are charged off-helmet when the power module 200 is detached from the base unit 110.

In some embodiments, the data router 690 receives communication signals from, and routes communication signals between, one or more accessory devices, each interfaced with an accessory interface 300, 310, or 640, processor 600, and external power source 670. This can occur when the external power source 670 includes a body-worn hub that includes both power and data communication capabilities. In exemplary embodiments, the data router 690 receives and routes communication signals using one or more wired or wireless protocols, for example USB, UART, or I2C.

The wireless interface 695 is configured for communication over one or more wireless technologies, for example one or more of Near Field Magnetic Induction data communication, UltraWideBand (UWB) RF communications, Bluetooth, Wi-Fi, and 3G, 5G, and/and LTE cellular communication. The wireless interface 695 is used by the base unit 110 to communicate with other devices mounted to the helmet 410, to body worn devices of the user of the helmet system 400, to users of other systems, and to other devices on a same wireless network. In some embodiments, the wireless interface 695 receives communication signals from the data router 690 and/or processor 600, transmits communication signals over a wireless network, receives communication signals over the wireless network, and provides the received communication signals to the data router 690 and/or processor 600.

In some embodiments, the processor 600 mounts a USB endpoint 693 for communicating with a body worn hub 670 over a USB link. In particular, the processor receives communication signals from one or more accessories, e.g. from a vision system 500 connected to the vision system interface 310 and a communication system connected to the additional accessory 640 using a first communication protocol, e.g. USB, UART, and/or I2C, converts the received communication signals to a USB data stream and transmits the USB data stream to the body worn hub using the USB endpoint 693. In a similar manner, the processor can receive, via the USB end point 693, a data stream from the body work hub, extract communication signals for or more accessories from the received USB data stream, and the communication signals to the one or more accessories using the first communication protocol.

In embodiments, the processor 600 receives power-related data from or corresponding to power sources comprising the power network 100 and powered accessories operably connected to the base unit 110, for example SoC of one or more of an internal power source 650 and/or removable power source 740, 745, and power requirements of operably connected powered accessories. The processor 600 can collect and store the power-related data and, in some embodiments, communicate the power-related data to one or more external devices or processors, for example via wireless interface 695 or to a hub over external power cable 132.

1.4.6 Example Operating Modes

Figure 6:
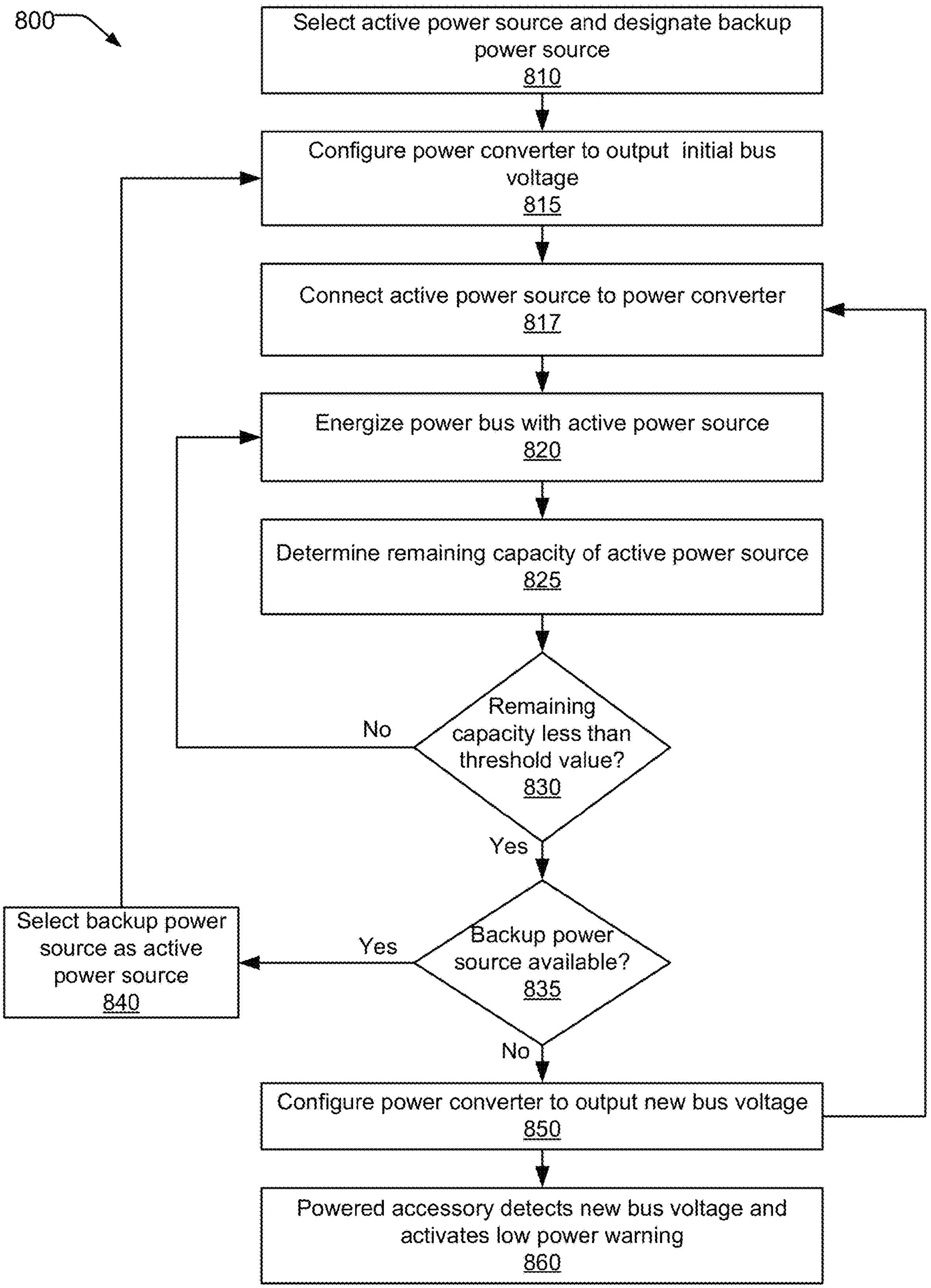

FIG. 6 shows an exemplary operating method 800 performed by components of the power system 100. At step 810, the processor 600 selects an active power source and designates a backup power source. At step 815 the processor 600 configures the power converter 625 to output a power signal having an initial bus voltage. According to step 815, the processor configures the power converter to either buck or boost voltage of a power signal received from an active power source. In an exemplary implementation, the processor 600 configures the output converter 625 to output a power signal having a bus voltage corresponding to a preferred operating voltage of one or more powered accessory devices that are electrically connected to the power bus 620.

According to step 817, the processor connects an active power source to the power converter 625. For this purpose, the processor 600 instructs the MUX 630 to connect the active power source to the power converter 625.

At step 820, the processor energizes the power bus 620 with the active power source, for example, by instructing the power converter 625 to provide a bucked or boosted power signal to the power bus. The processor monitors the active power source and determines a remaining capacity, for example an instantaneous remaining power level, of the active power source in step 825. At step 830, the processor 600 determines whether the remaining capacity is less than a threshold value. If the remaining capacity of the active power source is less than the threshold value in step 830, the method transitions to step 835; otherwise, the method transitions back to step 820 to continue energizing the power bus with the active power source.

In step 835, the processor 600 determines whether a backup power source is available. If a backup source is available, the method transitions to step 840, where the processor selects the backup power source to be the active power source. The method then transitions back to step 815. If a backup power source is not available in step 835, the method transitions to step 850.

According to step 850, the processor 600 configures the power converter to output a new bus voltage. For this purpose, the processor configures the power converter 625 to output a power signal having a bus voltage that is less that the preferred operating voltage, for example 2.9V, in response to determining that a remaining capacity of an active power source has fallen below the threshold value at step 830.

The method then transitions to step 817 to connect the active power source to the power converter, and also transitions to step 860.

In step 860, a powered accessory detects the new bus voltage and activates a low power warning. In an example, a powered accessory device, for example vision device 500, includes a low power warning system that responds to a drop in received power signal voltage. The low power warning system causes the powered accessory device to display a low power warning message or otherwise generate a low power warning in response to the drop in received power signal voltage. In this manner, the power system 100 advantageously prompts the powered accessory to alert a user that an active power source has reduced energy capacity without establishing a communication session with the powered accessory.

In an alternate or additional operating method, the processor, at step 860, can establish a communication session with the powered accessory and send a command to the powered accessory to generate a low power warning in addition to or instead of configuring the power converter to output the new bus voltage.

Figure 7:
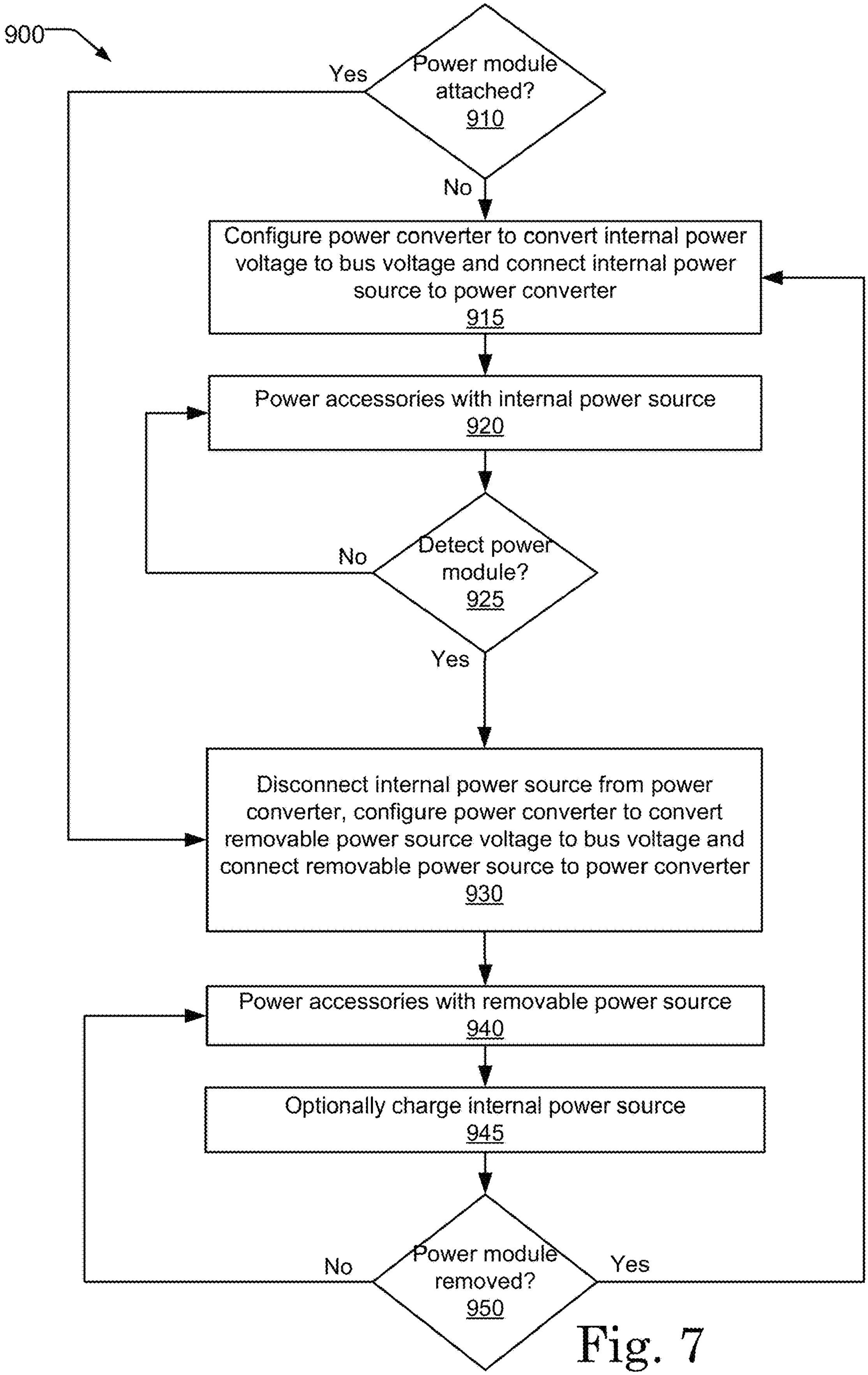
FIG. 7 is a flow chart that describes a method of operation of the power system in FIG. 1.

FIG. 7 shows an exemplary operating method 900 performed by components of the power system 100. Power system 100, when operating according to method 900, preferentially powers accessories, and optionally charges an internal power source 650, with a removable power source 740 or 745, when a power module 200 is electrically connected to base unit 110. Power system, when operating according to method 900, powers the accessories with the internal power source when a removable power source is not electrically connected to the base unit, for example when a power module 200 is disconnected from base unit 110, thereby enabling hot swapping of power modules without interrupting a flow of power to the accessories.

At step 910, the processor 900 determines whether a power module 200 is attached to the base unit 110 and includes at least one removable power source capable of providing power to the base unit. If not, at step 915 the processor configures the power converter 625 to convert a voltage of a power signal received from internal power source 650 to a bus voltage and connects the output of the internal power source to the input of the power converter, for example, by communicating control signals to MUX 630, and configures the power system 100 to power accessories with power provided by the internal power source.

The processor 600 monitors available power sources and determines, at step 925, whether a power module 200 has been attached to and operably connected to the base unit 110. If not, the process returns to step 920 where the internal power source continues to power accessories.

If, at step 910, the processor 600 determines that a power module 200 is attached to the base unit 110 or if the processor determines that a power module 200 has been attached to the base unit at step 925, to process continues to step 930 where the processor disconnects the internal power source from the power converter, for example, by sending control signals to the MUX 630, configures to power converter 625 to convert voltage of a power signal from a removable power source to a bus voltage, and connects the removable power source to the power converter, for example, by sending control signals to the MUX.

At step 940, the processor causes accessories to be powered by power from one or more removable power sources, for example by sending control signals to the power converter 625 to cause to power converter to provide a power signal to the power bus.

At step 945, the processor optionally charges an internal power source with power provided by one or more removable power sources, for example, by communicating control signals to the charging circuit 680.

The operating method 900 continues to step 950, where the processor 600 determines whether the power module 200 has been removed, or whether removable power source no longer includes a removable power source capable of providing adequate power, for example if the removable power source has a SoC less than a threshold value. If the determination is no, the process loops back to step 940 wherein accessories are powered with the removable power source. If the determination is yes, the process loops back to step 915 and power is subsequently supplied by a source of internal power.

Figure 8:
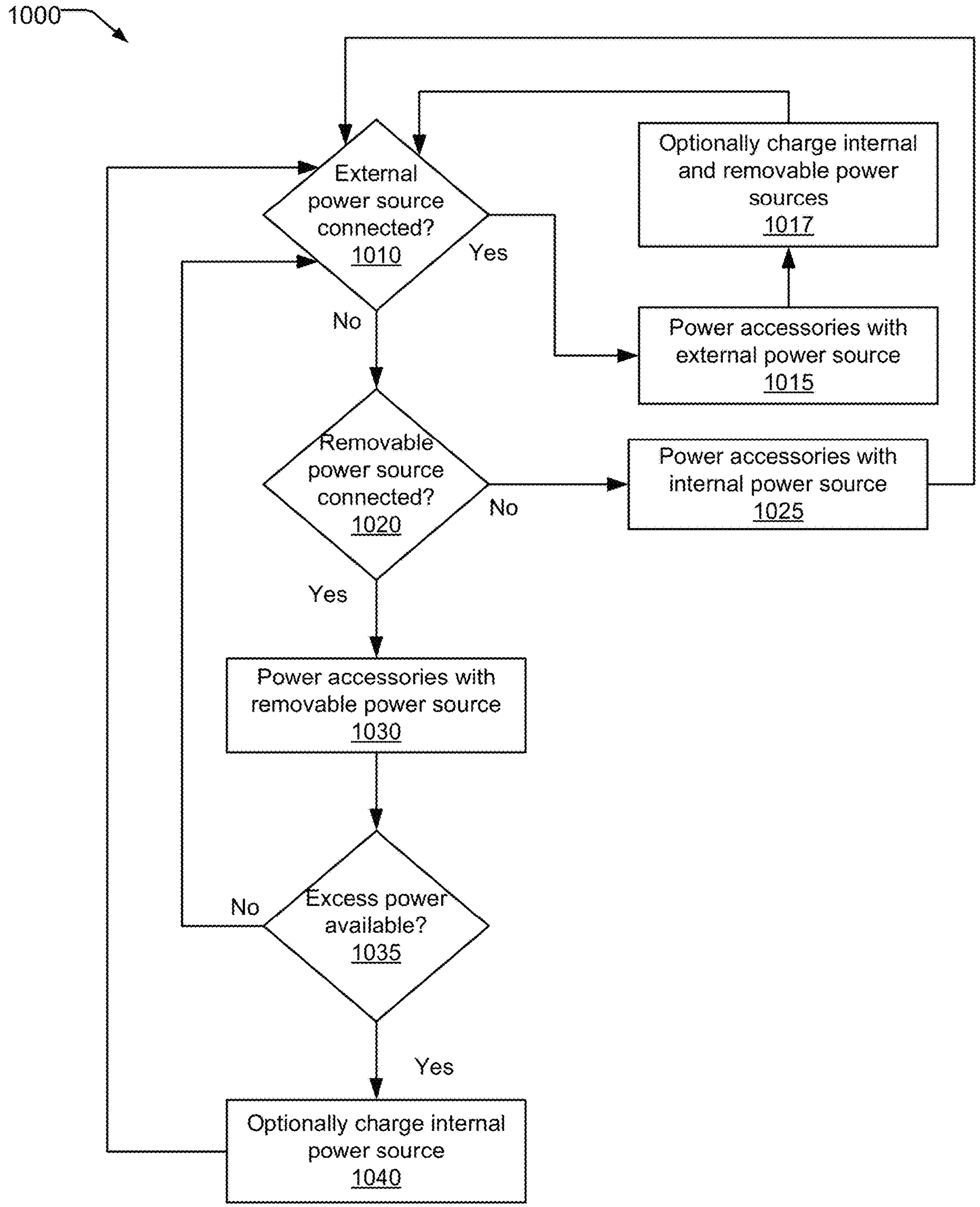
FIG. 8 is a flow chart that describes a method of operation of the power system in FIG. 1.

FIG. 8 shows an exemplary operating method 1000 performed by components of power system 100. Power system 100, when operating according to method 1000, provides power to accessories from connected power sources in priority order of power source. Priority order of power sources includes external power source 670>removable power source 740>internal power source 650. Power system 100, when operating according to method 1000, optionally charges internal power source 650 with power provided by removable power source 740. Power system 100, when operating according to method 1000, further optionally charges internal power source 650 and removable power source 740 with power provided by external power source 670.

At step 1010, the processor 600 determines whether and external power source 670 is electrically connected to the base unit 110.

If an external power source is connected, the processor, at step 1015, powers accessories that are electrically connected to the base unit with power from the external power source, for example, by communicating control signals to the power converter 625 and to the MUX 630 that cause the MUX to connect the external power source to the input 627 of the power converter and that cause the power converter to convert a voltage of a power signal received from the external power source to a bus voltage and to energize the power bus 620 with the voltage-converted power signal. The processor 600 may, at step 1017, optionally cause one or both of internal power source 650 and removable power sources 740, 745 to be charged by communicating control signals to one or both of the charging circuits 680 and 685.

If, at step 1010, the processor 600 determines that an external power source 670 is not connected to the base unit 110, the method continues to step 1020 where the processor determines whether a removable power source 740, 745 is connected, i.e. whether a power module comprising one or more removable power sources is attached to the base unit 110. If the processor does not detect an external power source at step 1020, the process continues to step 1025 where the processor causes accessories to be powered with power provided by an internal power source, as described in relation to steps 925 and 920 of method 900 shown in FIG. 7. If, at step 1020, the processor determines that one or more removable power sources are connected, the processor causes, at step 1030, accessories to be powered with power from the one or more removable power sources, as described in relation to steps 930 and 940 of method 900 shown in FIG. 7.

At step 1035, the processor determines whether excess power is available from the one or more removable power sources when power is supplied to the accessories. If excess power is available, to processor optionally causes the internal power source 650 to be charged, for example, by sending control signals to charging circuit 680.

Process 1000 iterates by looping back to step 1010 and in examples continues iterating as long as power from at least one source is available to the processor 600

Figure 9:
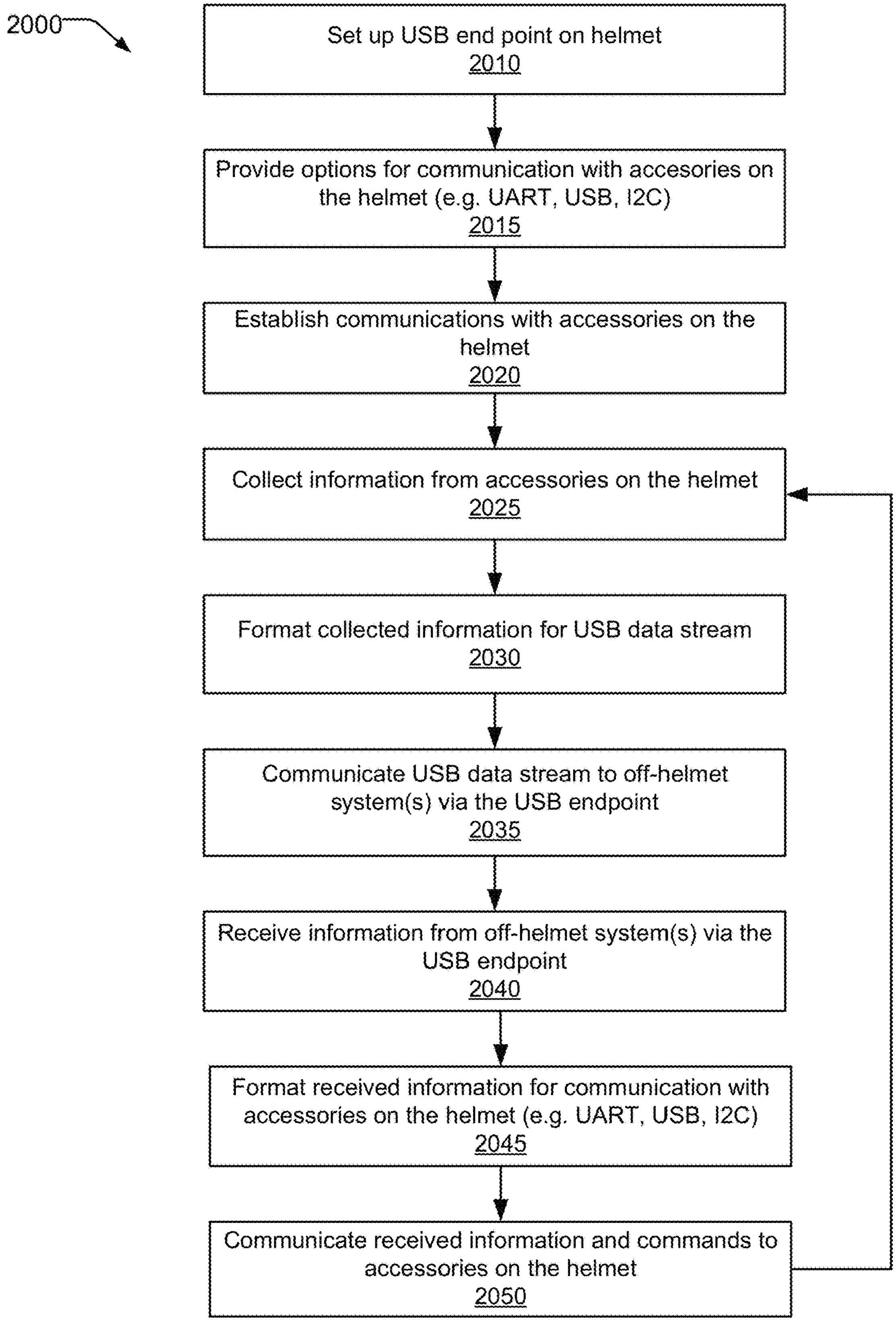
FIG. 9 is a flow chart that describes a method of operation of the power system in FIG. 1.

FIG. 9 shows an exemplary operating method 2000 performed by components of the power system 100. The processor 600 sets up a USB endpoint 693, at step 2010, provides options for communicating with helmet-mounted accessories that are connected to the power system at step 2015, and establishes communications with at least some of the helmet-mounted accessories at step 2020. The processor 600 may communicate with the accessories using one or more communication methods; for example, USB, UART, and/or I2C. Depending on a configuration of a helmet system and upon specific accessories attached to the helmet system, the processor may communicate with a first accessory using a first communication method and a second accessory using a second communication method. In a particular example embodiment, the processor communicates with multiple accessories using USB communications and operates as a USB host, or controls a separate USB host, to do so. The processor collects or otherwise receives information from one or more helmet mounted accessories at step 2025. At step 2030, the processor formats information received from various accessories and power system components for communication of the received information with an off-helmet system such as a USB data stream. The received information can include, for example a state of charge of a removable power source and of an internal power source, power requirements of one or more powered accessories, and information generated by one or more accessories; for example, sound data from a communication system or image data from an imaging system. In example embodiments, the processor combines information corresponding to or received from multiple accessories into a single stream of USB data. The processor then communicates the USB-formatted received data to the off-helmet system using the USB endpoint at step 2035. In a similar manner, the processor can receive USB data, via the USB endpoint, from an off-helmet system at step 2040. The received USB data may include communications or other information for delivery to one or more accessories. At step 2045, the processor formats the received information for communication with one or more helmet mounted accessories (for example for communication via USB, UART, or I2C) and communicates the received information to the accessories at step 2050. The processor can also communicate commands to one or more accessories; for example, the processor can generate, and communicate to a night vision device, a command to illuminate a low power warning display on the night vision device in response to the processor determining a level of power available from a power source is less than a threshold value.

1.4.7 Additional Views of Power Module 200

Figure 10:
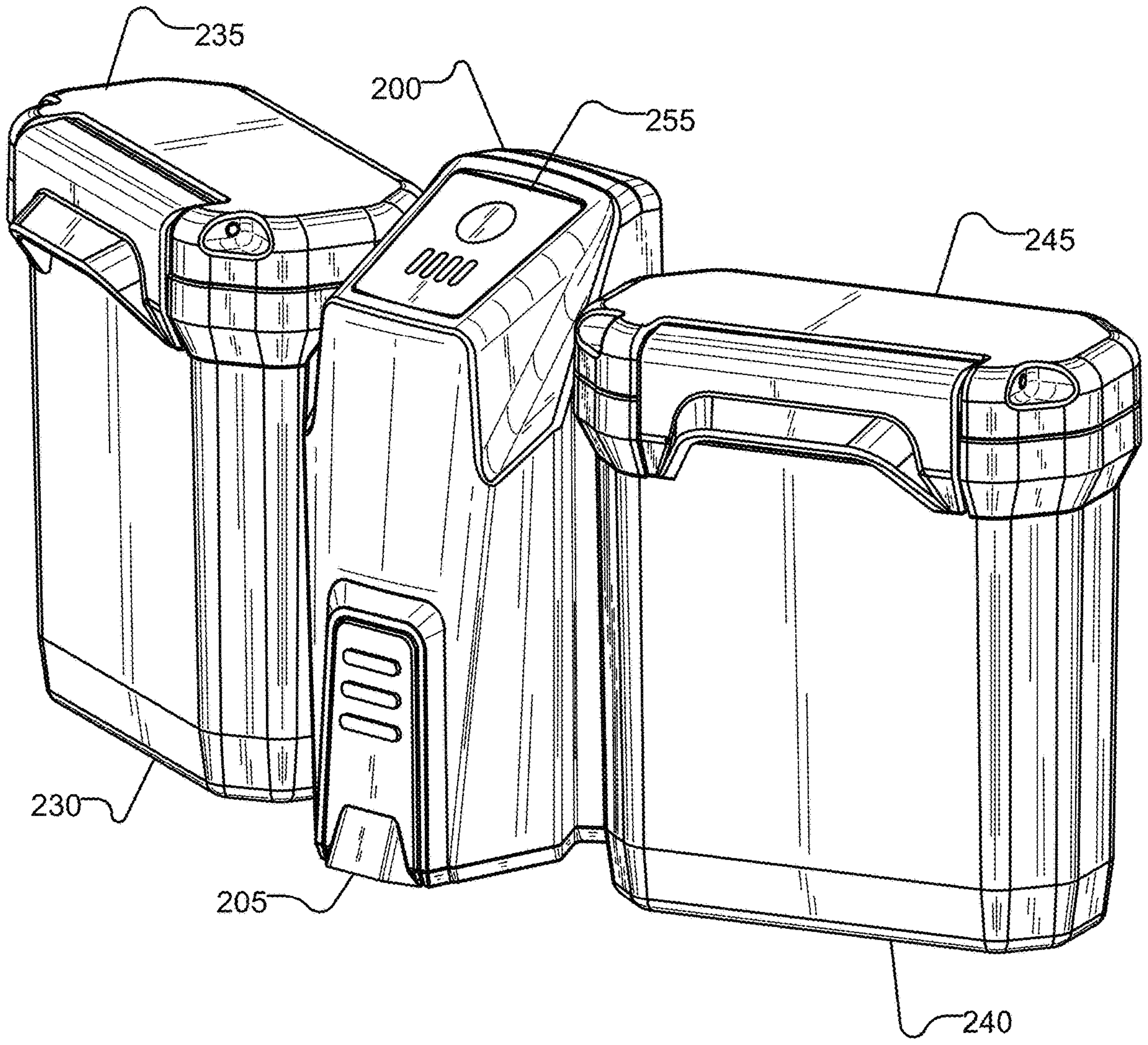
FIG. 10 is a front perspective view of the power module in FIG. 4A.
Figure 11:
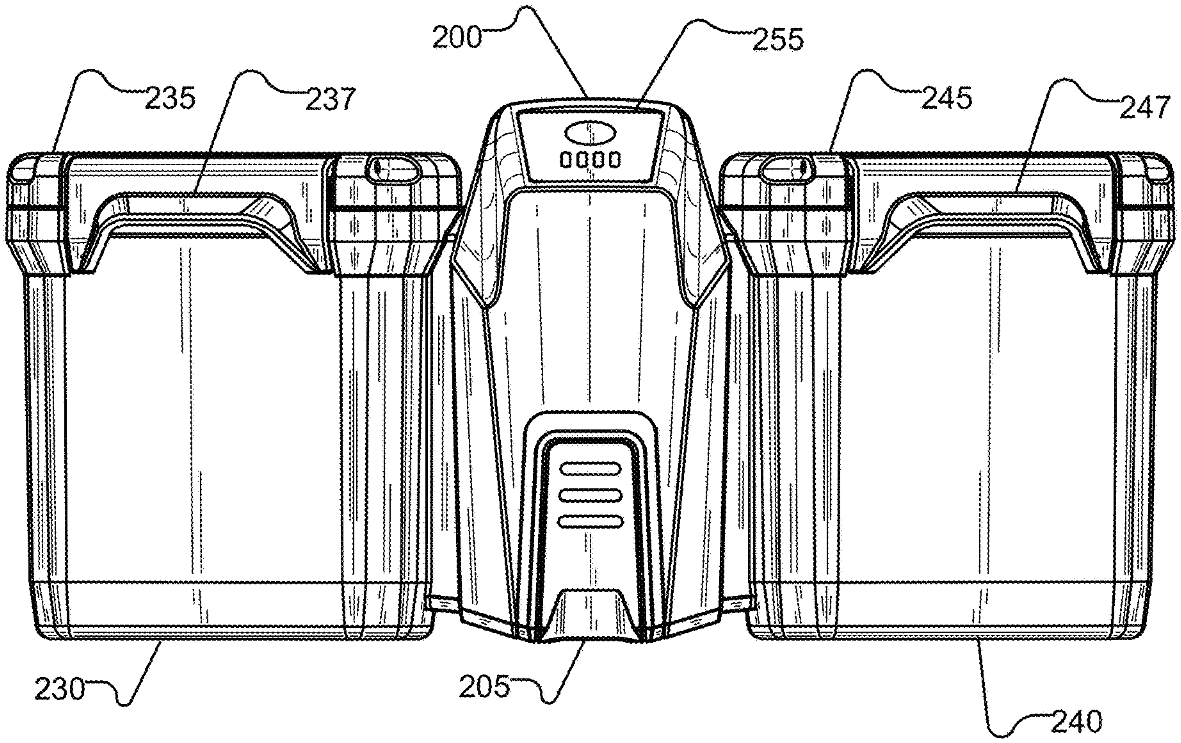
FIG. 11 is a front view of the power module in FIG. 4A.
Figure 12:
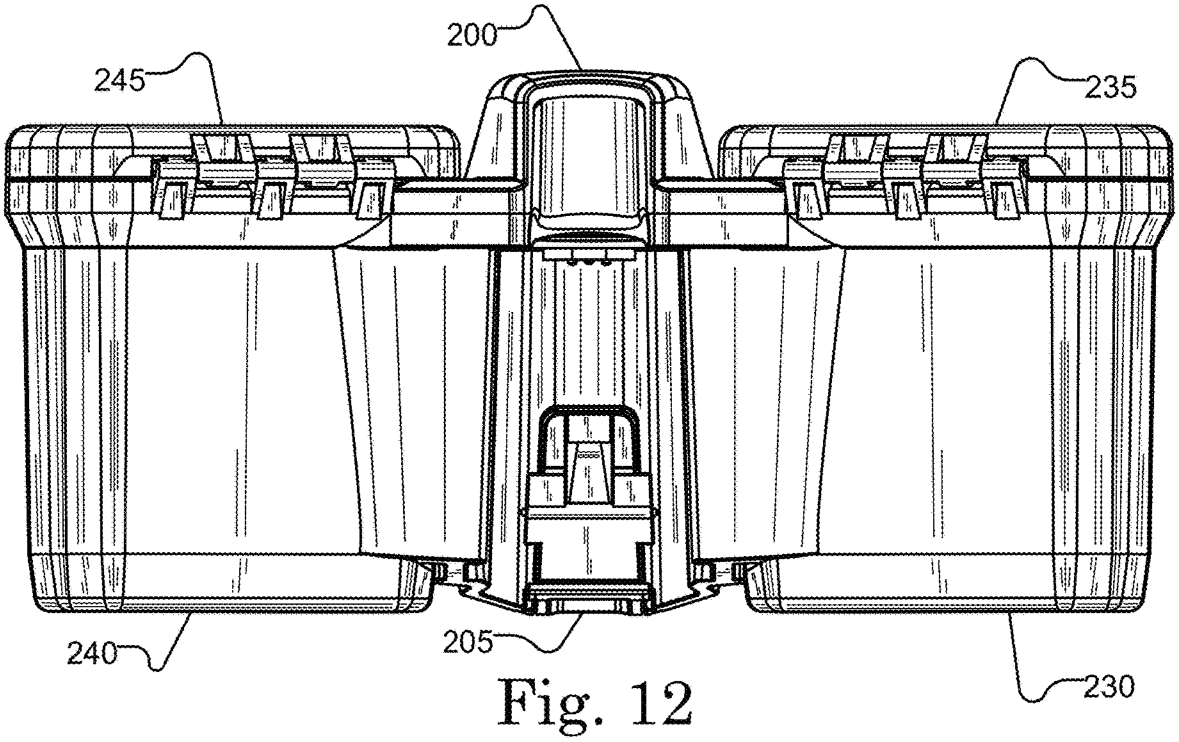
FIG. 12 is a rear view of the power module in FIG. 4A.
Figure 13:
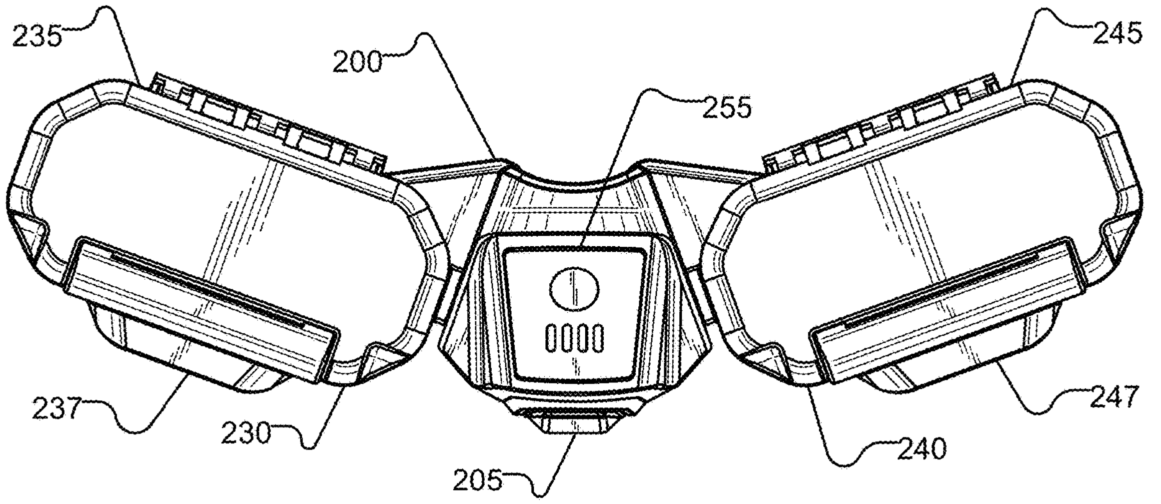
FIG. 13 is a top view of the power module in FIG. 4A.
Figure 14:
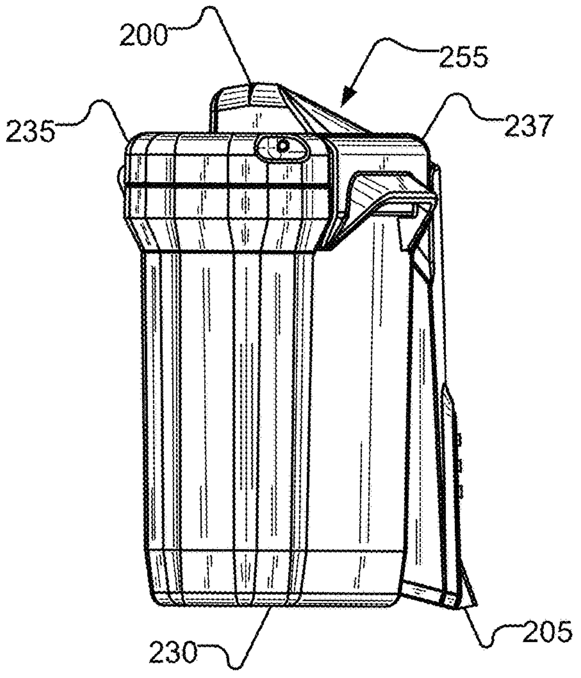
FIG. 14 is a left view of the power module in FIG. 4A.
Figure 15:
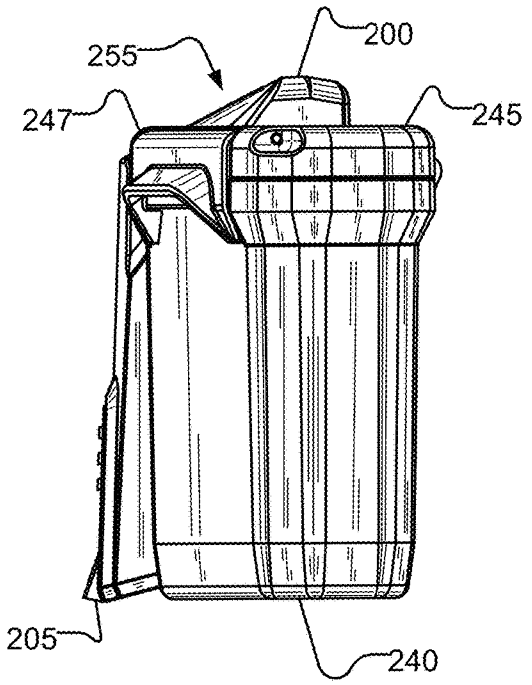
FIG. 15 is a right view of the power module in FIG. 4A.

FIG. 10 shows a front perspective view of the power module 200, FIG. 11 shows a front view of the power module, FIG. 12 shows a rear view of the power module, FIG. 13 shows a top view of the power module, FIG. 14 shows a left view of the power module, and FIG. 15 shows a right view of the power module. The power module 200 includes power module release 205 and power level indicator 255. The power module further includes first removable power source compartment 230, first removable power source compartment cover 235, release 237, includes second removable power source compartment 240, second removable power source compartment cover 245, and release 247.

1.4.8 Design Protection

Referring now to FIGS. 1, 2, 3, 4A, 4B, 10, 11, 12, 13, 14, and 15, the power system 100, and components thereof, include features that are suitable for design patent protection, as would be apparent to a person skilled in the art based on the illustrated features. For example, the power module 200 includes features suitable for design protection, for example the shapes and contours of the removable power source compartments 230 and 240, covers 235, 245, and releases 237, 247. Additional exemplary, non-limiting, features suitable for design protection include the shapes and contours of the interface surfaces 117, 217, 219, of the protrusions 122, 124, 226, 228, of the grooves 222, 224, and of the slots 126, 128. Still other exemplary, features suitable for design protection include the shape and contours of the power module release 205, the power level indicator 255, and one or more of the planar and curved surfaces of the power module 200 surrounding these features. These and other features can be illustrated in alternative or additional views (not shown) that include one or more features and/or components illustrated in broken lines to disclaim those features and/or components from design patent protection. For example, an alternative or additional view (not shown) of the power module 200 can include the removable power source compartments 230, 240, covers 235, 245, and latches 237, 247 shown in broken lines to disclaim those features and one or more other components of the power module in 200 shown in solid lines to claim those features for design patent protection. Further, one or more sides, in whole or in part, may be illustrated in broken lines to disclaim portions of the design in any combination.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment, and for particular applications (e.g. for attachment to a military-style helmet that includes a rail system), those skilled in the art will recognize that its usefulness is not limited thereto and that the present invention can be beneficially utilized in any number of environments and implementations where it is desirable to add, remove, and reconfigure a power system to an item of apparel. Accordingly, the claims set forth below should be construed in view of the full breadth and spirit of the invention as disclosed herein.

What is claimed is:

1. A helmet system comprising:
a helmet;
a processor; and
connections to a first power source, a second power source and at least one accessory device; and
wherein the processor is configured to: select one of the first power source and the second power source as an active power source for the at least one accessory device, select the first power source or the second power source not selected as the active power source as a backup power source for the at least one accessory device, detect when a remaining capacity of the active power source is less than a threshold, and select the backup power source as a new active power source for the at least one accessory device in response to detecting the remaining capacity of the active power source is less than the threshold.

2. The helmet system of claim 1 wherein at least one of the first power source and the second power source is removably attachable to the helmet system via the connections.

3. The helmet system of claim 1 wherein the processor determines an amount of power available from the first and second power sources, and if less than a threshold, enables a low power indicator on the at least one accessory device.

4. The helmet system of claim 1 comprising a communication interface for receiving information from the at least one accessory device and wherein the processor enables a transmission to a user-worn hub via the communication interface in response to the information.

5. The helmet system of claim 1 further comprising a power converter connected to the first power source, the second power source and the processor.

6. The helmet system of claim 5 further comprising a power bus connected to the power converter and a plurality of accessory devices.

7. The helmet system of claim 6 further comprising a charging circuit and an external power and data interface connected to the charging circuit, the first power source, the processor and the power bus, wherein the external power and data interface connects to an external power source.

8. The helmet system of claim 1 wherein the second power source comprises a plurality of second power sources.

9. An apparatus for a helmet comprising:
means for attaching to the helmet;
connections to a first power source, a second power source and at least one accessory device; and
wherein the apparatus is configured, via a processor, to: select one of the first power source and the second power source as an active power source for the at least one accessory device, select the first power source or the second power source not selected as the active power source as a backup power source for the at least one accessory device, detect when a remaining capacity of the active power source is less than a threshold, and select the backup power source as a new active power source for the at least one accessory device in response to detecting the remaining capacity of the active power source is less than the threshold.

10. The apparatus of claim 9 wherein the apparatus is removably attachable to the helmet by a user.

11. The apparatus of claim 9 wherein the first power source is included in the apparatus.

12. The apparatus of claim 9 wherein the second power source is removably attachable to the apparatus by a user.

13. The apparatus of claim 9 wherein the processor is included in the apparatus.

14. The apparatus of claim 9 wherein the processor and the first power source are mounted to a unit removably attachable to the helmet.

15. The apparatus of claim 14 wherein the second power source is mounted to a power module removably attachable to the unit.

16. The apparatus of claim 15 wherein the second power source comprises a plurality of second power sources mounted to the power module.

17. A helmet system comprising:
a helmet;
a processor; and
connections to a first power source, a second power source and at least one accessory device; and
wherein the processor is configured to select one of the first power source and the second power source as an active power source for powering the at least one accessory device in response to detecting a threshold,
the processor and the first power source are mounted to a unit removably attachable to the helmet,
the second power source is mounted to a power module removably attachable to the unit, and
the second power source comprises a plurality of second power sources,
further comprising:
a power and data interface connecting the unit and the power module; and
one or more switching elements for connecting or disconnecting any one of the plurality of second power sources in response to the processor detecting the threshold.

18. The helmet system of claim 17 further comprising an external power and data interface mounted to the unit.

19. The helmet system of claim 18 wherein in response to detecting the threshold, the processor selects an external power source connected to the external power and data interface as the active power source.

20. The helmet system of claim 18 further comprising a charging circuit mounted to the unit and connected to the processor, the first power source, and the external power and data interface.

21. The helmet system of claim 18 further comprising a power converter mounted to the unit and connected to the processor, the first power source, and the external power and data interface.

22. The helmet system of claim 21 further comprising a power bus mounted to the unit and connected to the power converter and a plurality of accessories.

23. The helmet system of claim 22 further comprising one or more switching elements for connecting or disconnecting the first power source in response to the processor detecting the threshold.

24. A helmet system comprising:

a helmet;

a processor; and connections to a first power source, a second power source and at least one accessory device;

wherein the processor and the first power source are mounted a unit removably attachable to the helmet; and wherein the processor is configured to select one of the first power source and the second power source as an active power source for powering the at least one accessory device in response to detecting a threshold, the helmet system further comprising:

an external power and data interface mounted to the unit;

a charging circuit mounted to the unit and connected to the processor, the first power source, and the external power and data interface; and a second charging circuit connected to the processor, the external power and data interface, and a selected one of a plurality of power sources.

* * * * *